United States Patent
Ishii et al.

(10) Patent No.: US 11,332,052 B2
(45) Date of Patent: May 17, 2022

(54) CENTRIFUGAL BLOWER DEVICE

(71) Applicant: DENSO CORPORATION, Kariya (JP)

(72) Inventors: Fumiya Ishii, Kariya (JP); Shuzo Oda, Kariya (JP); Shouichi Imahigashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 335 days.

(21) Appl. No.: 16/562,117

(22) Filed: Sep. 5, 2019

(65) Prior Publication Data
US 2019/0389344 A1    Dec. 26, 2019

Related U.S. Application Data

(63) Continuation of application No. PCT/JP2018/006459, filed on Feb. 22, 2018.

(30) Foreign Application Priority Data

Mar. 29, 2017 (JP) .............................. JP2017-065500
Dec. 22, 2017 (JP) .............................. JP2017-246830

(51) Int. Cl.
*F04D 29/28* (2006.01)
*B60N 2/56* (2006.01)
(Continued)

(52) U.S. Cl.
CPC ........... *B60N 2/565* (2013.01); *F04D 29/162* (2013.01); *F04D 29/281* (2013.01);
(Continued)

(58) Field of Classification Search
CPC .. F04D 29/162; F04D 29/281; F04D 29/4226; F04D 29/667
See application file for complete search history.

(56) References Cited

U.S. PATENT DOCUMENTS

| 2012/0275915 A1 | 11/2012 | Konishi et al. |
| 2016/0264028 A1* | 9/2016 | Kawashima .......... F04D 29/023 |
| 2019/0093665 A1* | 3/2019 | Ishii ...................... F04D 29/28 |

FOREIGN PATENT DOCUMENTS

| JP | 2012229657 A | 11/2012 |
| JP | 2015108369 A | 6/2015 |

(Continued)

OTHER PUBLICATIONS

U.S. Appl. No. 16/562,156, filed Sep. 5, 2019, Ishii et al.

*Primary Examiner* — Sabbir Hasan
(74) *Attorney, Agent, or Firm* — Harness, Dickey & Pierce, P.L.C.

(57) ABSTRACT

A centrifugal blower device includes a rotating shaft, a turbo fan unit and a casing. A shroud ring of the turbo fan unit and a cover portion of the casing form a gap between them. The gap includes a radial gap formed between the cover portion and the shroud ring in a radial direction and an axial gap formed between the cover portion and the shroud ring in an axial direction. The radial gap is located at a position outside of a shroud-side inner peripheral end in the radial direction. The axial gap is located at a position inside of the radial direction in the radial direction. A minimum gap dimension of the radial gap is smaller than a minimum gap dimension of the axial gap. A shortest distance between the shroud-side inner peripheral end and the cover portion is larger than the minimum gap dimension of the radial gap.

8 Claims, 10 Drawing Sheets

(51) Int. Cl.
  *F04D 29/42* (2006.01)
  *F04D 29/16* (2006.01)
  *F04D 25/06* (2006.01)
  *F04D 29/66* (2006.01)

(52) U.S. Cl.
  CPC ...... *F04D 29/4226* (2013.01); *F04D 25/0613* (2013.01); *F04D 29/667* (2013.01)

(56) References Cited

FOREIGN PATENT DOCUMENTS

| | | |
|---|---|---|
| JP | 2016102468 A | 6/2016 |
| JP | 2017020409 A | 1/2017 |
| WO | WO-2017145780 A1 | 8/2017 |

\* cited by examiner

CENTRIFUGAL BLOWER DEVICE

CROSS REFERENCE TO RELATED APPLICATION

This application is a continuation of International Patent Application No. PCT/JP2018/006459 filed on Feb. 22, 2018, which designated the U.S. and claims the benefit of priority from Japanese Patent Applications No. 2017-65500 filed on Mar. 29, 2017 and No. 2017-246830 filed on Dec. 22, 2017. The entire disclosures of all of the above applications are incorporated herein by reference.

FIELD OF TECHNOLOGY

The present disclosure relates to a centrifugal blower device.

BACKGROUND

A centrifugal blower device is known in the art. The centrifugal blower device includes a rotating shaft, a turbo fan rotated with the rotating shaft, and a casing for accommodating therein the turbo fan. The turbo fan has multiple fan blades and a shroud ring. The shroud ring is connected to one end of each fan blade in an axial direction of the rotating shaft. The casing has a cover portion arranged on one side of the shroud ring in the axial direction of the rotating shaft. The shroud ring and the cover portion form a space between them.

The space includes a radial gap formed between the cover portion and the shroud ring in a radial direction of the turbo fan and an axial gap formed between the cover portion and the shroud ring in the axial direction of the rotating shaft. The axial gap and the radial gap form a labyrinth sealing structure. According to such a structure, pressure loss can be increased when air flows through the space between the shroud ring and the cover portion. Therefore, it is possible to reduce a flow amount of a reverse flow, which passes through the space. The reverse flow is a flow of air passing through the space in a reversed direction opposite to an air flow, which passes through blade passages formed between respective neighboring fan blades among multiple fan blades.

According to the centrifugal blower device of the above prior art, however, a gap dimension of an outlet portion, which is one of spaces between the shroud ring and the cover portion and through which the reverse flow is discharged, is minimized. Due to such a structure, speed of the reverse flow discharged from the outlet portion to the blade passages becomes larger. As a result, the air flow in the blade passages may be disturbed and noise is increased.

SUMMARY OF THE DISCLOSURE

It is an object of the present disclosure to provide a centrifugal blower device, according to which disturbance of the air flow in the blade passages is suppressed and the flow amount of the reverse flow is made to be smaller.

DETAILED DESCRIPTION OF THE EMBODIMENTS

Figure 1:
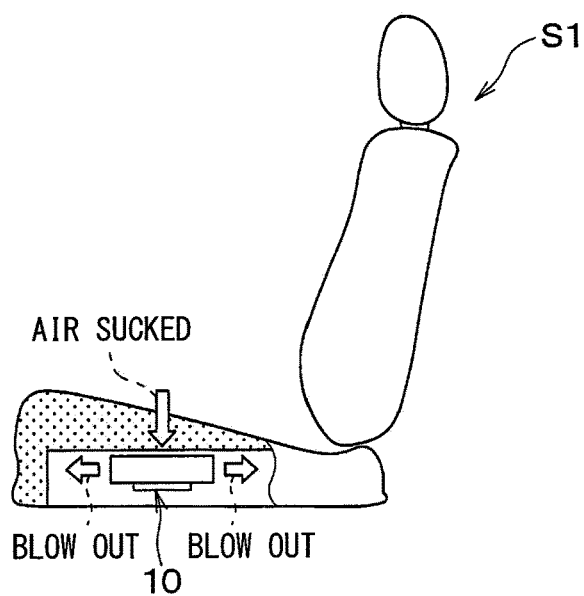
FIG. 1 is a schematic cross-sectional view showing a vehicle passenger seat, in which a centrifugal blower device of a first embodiment is arranged.

Embodiments for a centrifugal blower device will be explained hereinafter with reference to the drawings. The same reference numerals are given to the same or similar structures and/or portions in each of the drawings in order to avoid repeated explanation.

First Embodiment

As shown in FIG. 1, a blower device 10 of a present embodiment is used for an air conditioning device of a vehicle passenger seat S1. The blower device 10 is arranged in an inside of the vehicle passenger seat S1, on which a passenger sits down. The blower device 10 draws air from a surface of the vehicle passenger seat S1 on a passenger side. The blower device 10 blows out the air in the inside of the vehicle passenger seat S1. The air blown out from the blower device 10 is discharged from a portion of the vehicle passenger seat S1 other than the surface of the passenger side.

Figure 2:
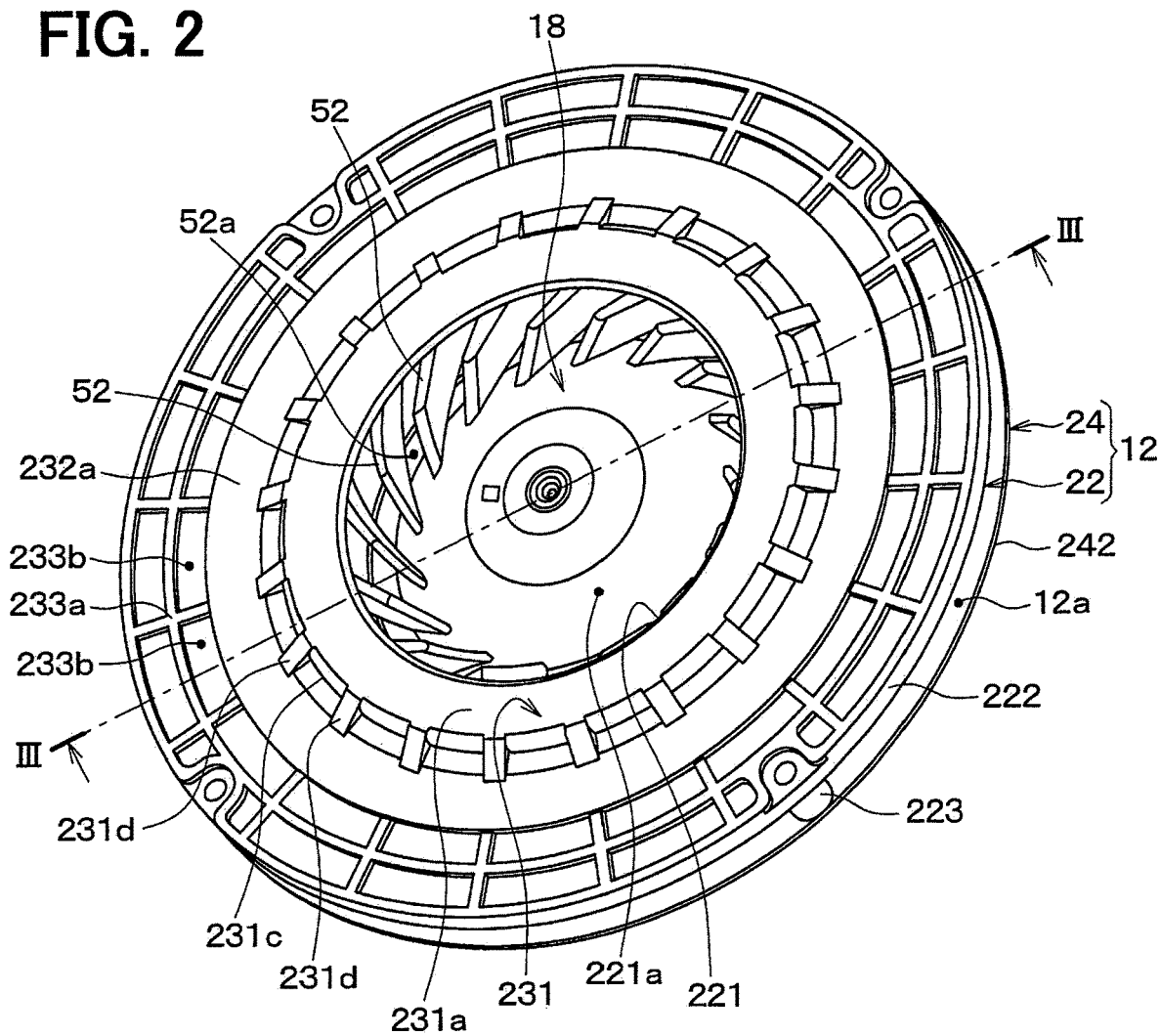
FIG. 2 is a schematic perspective view showing the centrifugal blower device of the first embodiment.
Figure 3:
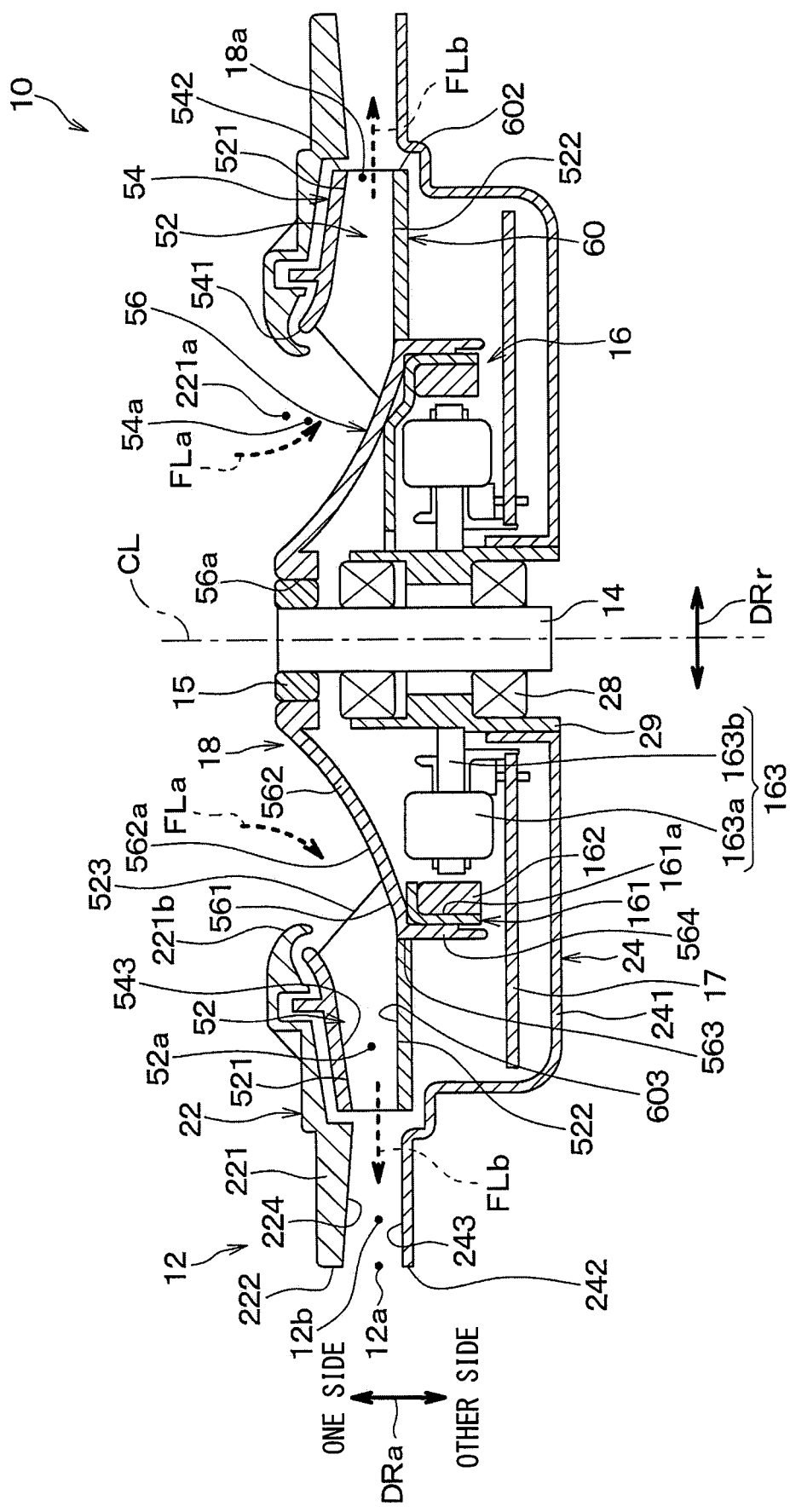
FIG. 3 is a schematic cross-sectional view taken along a line III-III in FIG. 2.

As shown in FIGS. 2 and 3, the blower device 10 is composed of a centrifugal blower device. More exactly, the blower device 10 is composed of a turbo-type blower. As shown in FIG. 3, the blower device 10 includes a casing 12, a rotating shaft 14, a shaft housing 15, an electric motor 16, an electronic circuit board 17, a turbo fan unit 18, bearings 28, a bearing housing 29 and so on. An arrow DRa in FIG. 3 shows a direction of a fan center axis. A fan center line CL coincides with a rotating axis of the rotating shaft 14. The direction of the fan center axis is also referred to as a fan axial direction of the rotating shaft. An arrow DRr in FIG. 3 shows a fan radial direction.

The casing 12 is a housing for the blower device 10. The casing 12 protects the electric motor 16, the electronic circuit board 17 and the turbo fan unit 18 from dust and blot of an outside of the blower device 10. For that purpose, the casing 12 accommodates therein the electric motor 16, the electronic circuit board 17 and the turbo fan unit 18. The casing 12 has a first casing member 22 and a second casing member 24.

The first casing member 22 is made of resin. The first casing member 22 is formed in an almost disc shape having a diameter larger than that of the turbo fan unit 18. The first casing member 22 has a first cover portion 221 and a first peripheral portion 222.

The first cover portion 221 is arranged on one side of the turbo fan unit 18 in the fan axial direction DRa. An air inlet opening 221a is formed on an inner peripheral side of the first cover portion 221, in such a way that the air inlet opening 221a penetrates the first cover portion 221 in the fan axial direction DRa. The air inlet opening 221a is a casing-side air suction port for sucking the air into an inside of the casing 12. The air is sucked into the turbo fan unit 18 via the air inlet opening 221a.

The first cover portion 221 has a bell-mouth portion 221b, which forms an outer periphery of the air inlet opening 221a. The bell-mouth portion 221b smoothly guides the air flowing from an outside of the blower device 10 into the air inlet opening 221a. The bell-mouth portion 221b is a casing-side inner peripheral end for forming the casing-side air suction port. The first peripheral portion 222 forms an outer periphery of the first casing member 22 around the fan center line CL.

As shown in FIG. 2, the first casing member 22 has multiple supporting pillars 223. Each of the supporting pillars 223 is arranged at an outside of the turbo fan unit 18 in the fan radial direction DRr. The first casing member 22 and the second casing member 24 are connected to each other in a condition that a forward end of each supporting pillar 223 is brought into contact with the second casing member 24.

The second casing member 24 is formed in an almost disc shape having a diameter almost equal to that of the first casing member 22. The second casing member 24 is made of the resin. The second casing member 24 may be made of metal, such as iron, stainless steel or the like.

As shown in FIG. 3, the second casing member 24 also functions as a motor housing for covering the electric motor 16 and the electronic circuit board 17. The second casing member 24 has a second cover portion 241 and a second peripheral portion 242.

The second cover portion 241 is arranged on the other side of the turbo fan unit 18 and the electric motor 16 in the fan axial direction DRa. The second cover portion 241 covers the other side of the turbo fan unit 18 and the electric motor 16. The second peripheral portion 242 forms an outer periphery of the second casing member 24 around the fan center line CL.

An air blow-out opening 12a is formed between the first peripheral portion 222 and the second peripheral portion 242, through which the air blown out from the turbo fan unit 18 is discharged.

The first cover portion 221 has a first opening-forming surface 224 at a position outside of multiple fan blades 52 in the fan radial direction DRr. The first opening-forming surface 224 is a part of a surface of the first cover portion 221 on the other side of the fan axial direction DRa. Therefore, the first opening-forming surface 224 is located on the other side of the first cover portion 221 in the fan axial direction DRa.

The second cover portion 241 has a second opening-forming surface 243 at a position outside of the multiple fan blades 52 in the fan radial direction DRr. The second opening-forming surface 243 is a part of a surface of the second cover portion 241 on the one side of the fan axial direction DRa. Therefore, the second opening-forming surface 243 is located on the one side of the second cover portion 241 in the fan axial direction DRa.

The first opening-forming surface 224 and the second opening-forming surface 243 form an air blow-out passage 12b between them, through which the air blown out from each blade passage 52a flows to the air blow-out opening 12a.

Each of the rotating shaft 14 and the shaft housing 15 is made of metal, such as, iron, stainless steel, brass or the like. The rotating shaft 14 is composed of a rod member. The rotating shaft 14 is inserted into the shaft housing 15 and each of inner races of the bearings 28 and fixed thereto. Each of outer races of the bearings 28 is press-inserted into the bearing housing 29 and fixed thereto. The bearing housing 29 is fixed to the second cover portion 241. The bearing housing 29 is made of metal, for example, such as aluminum alloy, brass, stainless steel or the like.

As above, the rotating shaft 14 and the shaft housing 15 are supported by the second cover portion 241 via the bearings 28. In other words, the rotating shaft 14 and the shaft housing 15 are rotatable around the fan center line CL with respect to the second cover portion 241.

In the inside of the casing 12, the shaft housing 15 is fitted into an inner peripheral hole 56a of a boss portion 56 of the turbo fan unit 18. Accordingly, the rotating shaft 14 and the shaft housing 15 are connected to the boss portion 56 of the turbo fan unit 18, so that the rotating shaft 14 and the shaft housing 15 are not rotatable with respect to the turbo fan unit 18. Namely, the rotating shaft 14 and the shaft housing 15 are integrally rotated with the turbo fan unit 18 around the fan center line CL.

The electric motor 16 is composed of a brushless DC motor of an outer-rotor type. The electric motor 16 includes a motor rotor 161, a rotor magnet 162 and a motor stator 163.

The motor rotor 161 is an outer rotor arranged at an outside of the motor stator 163 in the fan radial direction DRr. The motor rotor 161 is made of metal, such as steel sheets or the like. The motor rotor 161 is made by press forming of metal sheets.

The motor rotor 161 has a rotor cylindrical portion 161a. The rotor cylindrical portion 161a extends in a direction parallel to the fan axial direction DRa. The rotor cylindrical portion 161a is press-inserted into an inner peripheral side of an annular wall portion 564 of the turbo fan unit 18, as explained below. The motor rotor 161 is thereby fixed to the turbo fan unit 18.

The rotor magnet 162 is composed of a permanent magnet, for example, a rubber magnet including ferrite, neodymium or the like. The rotor magnet 162 is fixed to an inner peripheral surface of the rotor cylindrical portion 161a. Accordingly, the motor rotor 161 and the rotor magnet 162 are integrally rotated with the turbo fan unit 18 around the fan center line CL.

The motor stator 163 includes a stator coil 163a electrically connected to the electronic circuit board 17 and a stator core 163b. The motor stator 163 is arranged at a radial-inside position with a small gap with the rotor magnet 162. The motor stator 163 is fixed to the second cover portion 241 of the second casing member 24 via the bearing housing 29. As above, the electric motor 16 is supported by the second casing member 24 in the inside of the casing 12.

In the electric motor 16 having the above structure, flux change is generated in the stator core 163b by the stator coil 163a, when electric power is supplied to the stator coil 163a of the motor stator 163 from an outside power source. The flux change in the stator core 163*b* generates an attracting force for the rotor magnet 162. Therefore, the motor rotor 161 receives the attracting force for the rotor magnet 162 and thereby the motor rotor 161 is rotated around the fan center line CL. Accordingly, when the electric power is supplied to the electric motor 16, the turbo fan unit 18 fixed to the motor rotor 161 is rotated around the fan center line CL.

As shown in FIG. 3, the turbo fan unit 18 is an impeller applied to the blower device 10. The turbo fan unit 18 blows out the air when it is rotated around the fan center line CL in a predetermined fan rotational direction. In other words, when the turbo fan unit 18 is rotated around the fan center line CL, the air is drawn into the inside thereof from the one side of the fan axial direction DRa via the air inlet opening 221*a*, as indicated by an arrow FLa in FIG. 3. Then, the turbo fan unit 18 blows out the air drawn into the inside thereof to the outside of the turbo fan unit 18, as indicated by an arrow FLb in FIG. 3.

More exactly, the turbo fan unit 18 includes the multiple fan blades 52, a shroud ring 54, the boss portion 56 and an other-side side plate 60. Each of the multiple fan blades 52, the shroud ring 54, the boss portion 56 and the other-side side plate 60 is made of resin.

The multiple fan blades 52 are arranged around the fan center line CL. More exactly, the multiple fan blades 52 are arranged at intervals in a circumferential direction of the fan center line CL in such a manner that a space for air flow is respectively formed between the fan blades. As shown in FIG. 2, the multiple fan blades 52 form the blade passages 52*a* between the respective neighboring fan blades 52, so that the air flows through each of the blade passages 52*a*.

As shown in FIG. 3, each of the fan blades 52 has a one-side blade end 521, which is formed in the fan blade 52 on the one side of the fan axial direction DRa, and an other-side blade end 522, which is formed in the fan blade 52 on the other side of the fan axial direction DRa, that is, on the opposite side to the one side.

Figure 4:
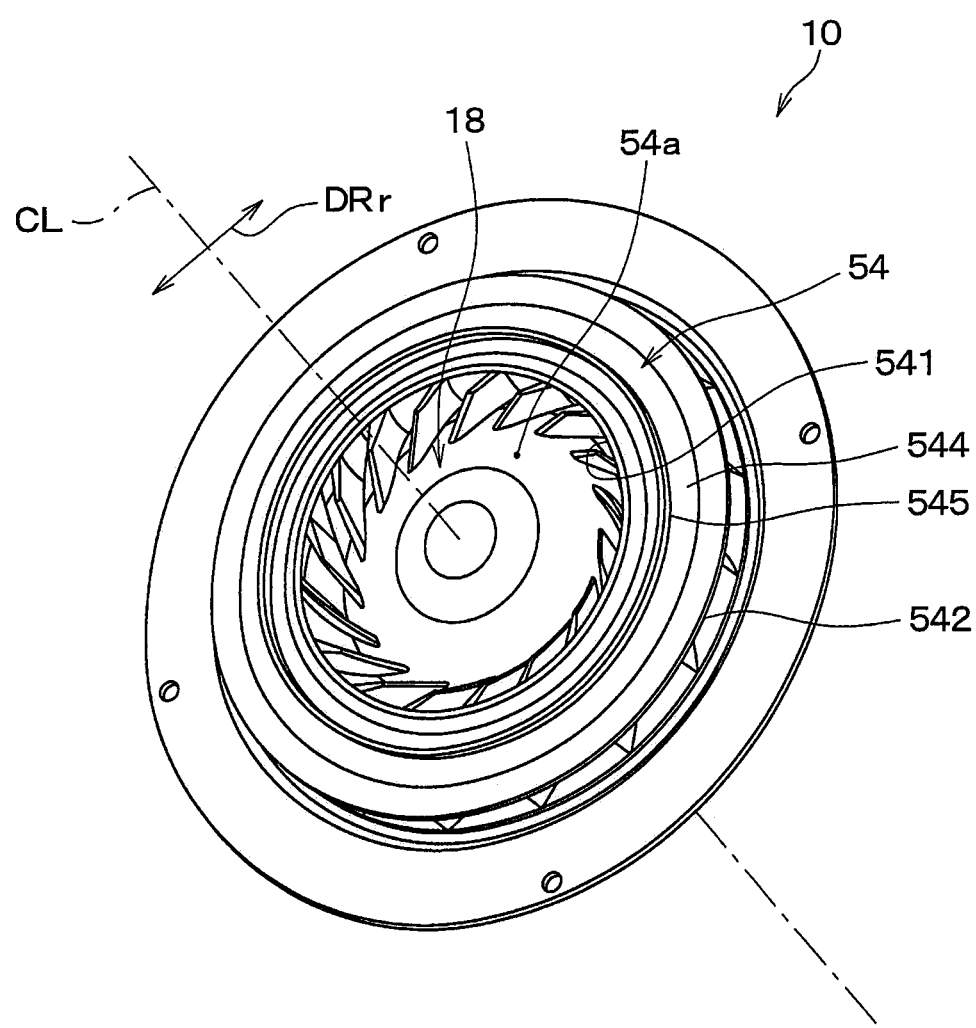
FIG. 4 is a schematic perspective view showing the centrifugal blower device of FIG. 2, wherein a first casing member is removed.

As shown in FIGS. 3 and 4, the shroud ring 54 is formed in a disc shape extending in the fan radial direction DRr. A fan-side air suction port 54*a* is formed at an inner peripheral side of the shroud ring 54. The air from the air inlet opening 221*a* of the casing 12 is sucked into the inside of the casing 12 via the fan-side air suction port 54*a*, as indicated by the arrow FLa. The shroud ring 54 is formed in an annular shape.

The shroud ring 54 has a shroud-side inner peripheral end 541 and a shroud-side outer peripheral end 542. The shroud-side inner peripheral end 541 is an inner end portion of the shroud ring 54 in the fan radial direction DRr. More exactly, the shroud-side inner peripheral end 541 is a forward-end portion including an inner-side forward end of the shroud ring 54 in the fan radial direction DRr. The shroud-side inner peripheral end 541 forms the fan-side air suction port 54*a*. The shroud-side outer peripheral end 542 is an outer end portion of the shroud ring 54 in the fan radial direction DRr.

As shown in FIG. 3, the shroud ring 54 is arranged at the one side of each fan blade 52 in the fan axial direction DRa, that is, on a side of the air inlet opening 221*a*. The shroud ring 54 is connected to each of the fan blades 52. In other words, the shroud ring 54 is connected to the one-side blade end 521 of each fan blade 52.

The boss portion 56 is connected to the rotating shaft 14, which is rotatable around the fan center line CL, via the shaft housing 15. An outer peripheral portion 561 of the boss portion 56 is connected to each of the multiple fan blades 52 at a position opposite to the shroud ring 54.

The boss portion 56 has a boss-side guide portion 562. The boss-side guide portion 562 has a boss-side guide surface 562*a* on the one side of the boss-side guide portion 562 in the fan axial direction DRa. The boss-side guide surface 562*a* has a surface shape, a surface point of which is displaced from its inside to its outside in the fan radial direction DRr when the surface point is moved from the one side to the other side in the fan axial direction DRa. The boss-side guide surface 562*a* guides the air flow in the inside of the turbo fan unit 18. The boss-side guide surface 562*a* guides the air flow sucked from the air inlet opening 221*a* in the fan axial direction DRa in such a way that the air flow is directed to the outside in the fan radial direction DRr. Accordingly, in the present embodiment, the boss-side guide surface 562*a* forms a guide surface for guiding the air flow from the air inlet opening to the blade passages. The boss-side guide portion 562 forms a guide portion having the guide surface.

Figure 5:
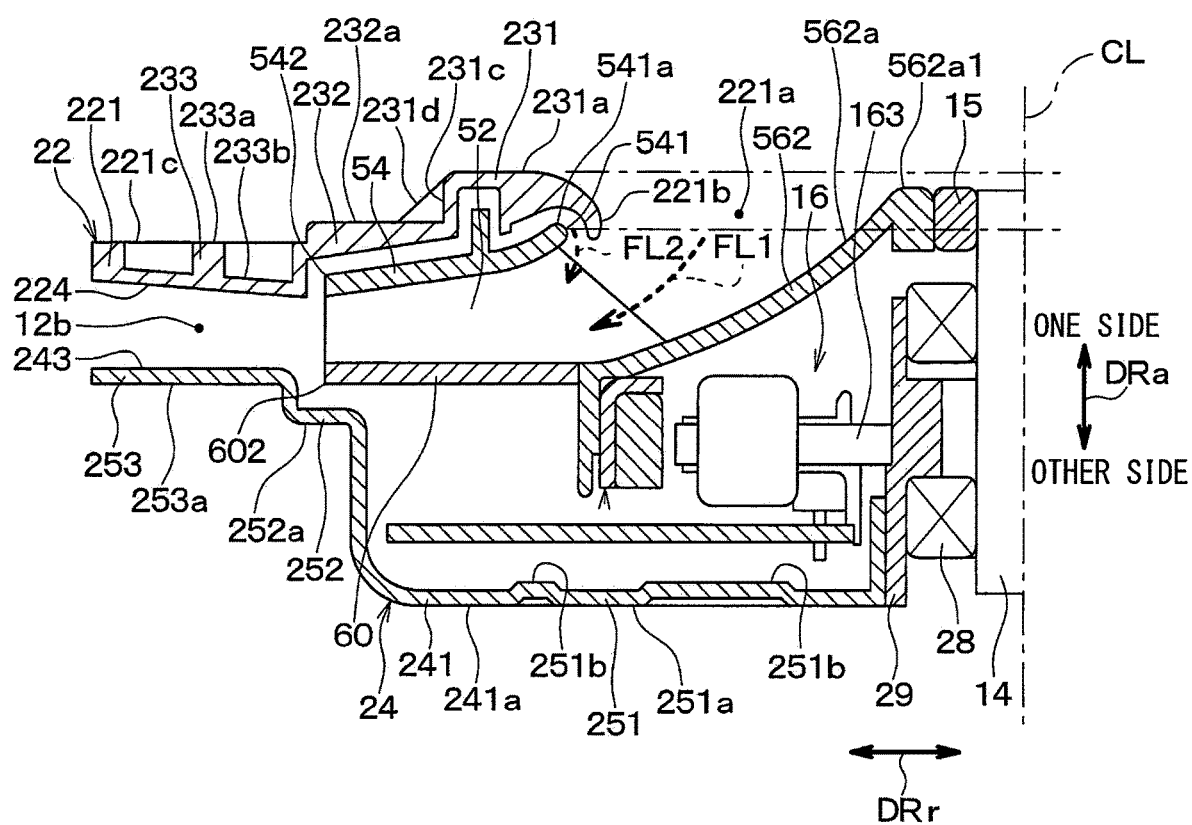
FIG. 5 is a schematically enlarged view showing a left-hand half portion of FIG. 3.

As shown in FIG. 5, the boss-side guide surface 562*a* has a one-side axial end 562*a*1. The shroud-side inner peripheral end 541 of the shroud ring 54 has a one-side axial end 541*a*. The one-side axial end 562*a*1 is located at a position more away from the one-side axial end 541*a* in the direction to the one side of the fan axial direction DRa. The one-side axial end 562*a*1 of the boss-side guide surface 562*a* is located at a position more away from a first surface 231*a* of a first step portion 231 (explained below) in the direction to the other side of the fan axial direction DRa.

According to the above structure, it is possible to more effectively change the direction of the air flow at a more upstream-side position from the fan axial direction DRa to the fan radial direction DRr, when compared the present embodiment with a comparison example. In the comparison example, contrary to the present embodiment, the one-side axial end 562*a*1 of the boss-side guide surface 562*a* is located at a position more away from the one-side axial end 541*a* of the shroud-side inner peripheral end 541 of the shroud ring in the direction to the other side of the fan axial direction DRa. As above, it is possible in the present embodiment to improve the flow of the sucked air.

The one-side axial end 562*a*1 of the boss-side guide surface 562*a* is an end portion of the boss-side guide surface 562*a*, which is located on the one side of the fan axial direction DRa. The one-side axial end 541*a* of the shroud-side inner peripheral end 541 is an end portion of the shroud-side inner peripheral end 541, which is located on the one side of the fan axial direction DRa. The first surface 231*a* of the first step portion 231 is an end portion of an inner peripheral portion of the first cover portion 221, including the bell-mouth portion 221*b*, wherein the end portion is located on the one side of the fan axial direction DRa.

As shown in FIG. 3, the boss portion 56 has a boss-side outer peripheral end 563 and the annular wall portion 564 of an annular shape. The boss-side outer peripheral end 563 is an end portion of the boss portion 56, which is located at an outside of the boss portion 56 in the fan radial direction DRr. More exactly, the boss-side outer peripheral end 563 is the end portion for forming the outer periphery of the boss-side guide portion 562. The boss-side outer peripheral end 563 is located at a position inside of the shroud-side inner peripheral end 541 in the fan radial direction DRr.

The annular wall portion 564 is a cylindrical rib extending from the boss-side outer peripheral end 563 to the other side of the fan axial direction DRa. The motor rotor 161 is fitted into an inside of the annular wall portion 564. Namely, the annular wall portion 564 has function as a rotor accommodating portion for accommodating the motor rotor 161.

When the annular wall portion 564 is fixed to the motor rotor 161, the boss portion 56 is fixed to the motor rotor 161.

The other-side side plate 60 is located at the other side of each fan blade 52 in the fan axial direction DRa. The other-side side plate 60 is connected to each of the multiple fan blades 52. In other words, the other-side side plate 60 is connected to the other-side blade end 522 of each fan blade 52. The other-side side plate 60 is connected to the outer peripheral end of the boss portion 56 in the fan radial direction DRr. The other-side side plate 60 has a shape extending in the fan radial direction DRr in a disc shape.

The shroud ring 54 and the other-side side plate 60 are connected to each of the fan blades 52. According to such a structure, the turbo fan unit 18 forms a closed fan. The closed fan is a turbo fan, in which both axial ends of each blade passage 52a formed between the respective fan blades 52 are covered by the shroud ring 54 and the other-side side plate 60 in the fan axial direction DRa.

Therefore, the shroud ring 54 has a ring-side guide surface 543, which faces the blade passages 52a and guides the air flow in the blade passages 52a. In addition, the other-side side plate 60 has a plate-side guide surface 603, which faces the blade passages 52a and guides the air flow in the blade passages 52a.

The plate-side guide surface 603 is opposed to the ring-side guide surface 543 across the blade passages 52a and arranged at a position outside of the boss-side guide surface 562a in the fan radial direction DRr. The plate-side guide surface 603 has a function for smoothly guiding the air flow flowing from the boss-side guide surface 562a to a fan-side air blow-out opening 18a.

The other-side side plate 60 has a plate-side outer peripheral end 602. The plate-side outer peripheral end 602 is a portion of the other-side side plate 60 at an outside thereof in the fan radial direction DRr.

The plate-side outer peripheral end 602 and the shroud-side outer peripheral end 542 are separately arranged from each other in the fan axial direction DRa. The plate-side outer peripheral end 602 and the shroud-side outer peripheral end 542 form the fan-side air blow-out opening 18a between the plate-side outer peripheral end 602 and the shroud-side outer peripheral end 542, wherein the air passing through the blade passages 52a is blown out from the fan-side air blow-out opening 18a.

As shown in FIG. 3, each of the fan blades 52 has a front-side blade edge 523. The front-side blade edge 523 is an end portion of the fan blade 52, which is formed at an upstream side of the air flow flowing along the arrows FLa and FLb, that is, at the upstream side in a direction of a main air flow. The main air flow is the air flow flowing in the blade passages 52a after passing through the fan-side air suction port 54a. The front-side blade edge 523 is protruded from the shroud-side inner peripheral end 541 to the inside of the turbo fan unit 18 in the fan radial direction DRr. In other words, the front-side blade edge 523 extends from the shroud-side inner peripheral end 541 to the inside of the turbo fan unit 18 in the fan radial direction DRr. The front-side blade edge 523 is connected to the outer peripheral portion 561 of the boss portion 56.

As shown in FIG. 3, the turbo fan unit 18 having the above structure is rotated together with the motor rotor 161 in a fan rotating direction DRf. Then, the fan blades 52 of the turbo fan unit 18 give quantity of motion to the air. The turbo fan unit 18 thereby blows out the air from the fan-side air blow-out opening 18a, which is opened at an outer periphery of the turbo fan unit 18, to a radial outside thereof. The air sucked from the fan-side air suction port 54a and pushed out by the fan blades 52, that is, the air blown out from the fan-side air blow-out opening 18a, is discharged to the outside of the blower device 10 via the air blow-out opening 12a formed in the casing 12.

As shown in FIG. 5, the first cover portion 221 of the first casing member 22 has the first step portion 231, a second step portion 232 and a third step portion 233. The first step portion 231, the second step portion 232 and the third step portion 233 are arranged in an order of the first step portion 231, the second step portion 232 and the third step portion 233 in a direction from the inside to the outside of the fan radial direction DRr.

The first step portion 231 has the first surface 231a. The second step portion 232 has a second surface 232a. The third step portion 233 has a third surface 233a. Each of the first surface 231a, the second surface 232a and the third surface 233a forms a part of an outer surface 221c of the first cover portion 221. The outer surface 221c of the first cover portion 221 is a surface of the first cover portion 221 on the one side of the fan axial direction DRa.

Each of the first surface 231a, the second surface 232a and the third surface 233a has a position different from one another in the fan axial direction DRa. More exactly, the second surface 232a is located at the position, which is closer to the other side of the fan axial direction DRa than the first surface 231a, that is, at the position closer to the second cover portion 241. The third surface 233a is located at the position, which is closer to the other side of the fan axial direction DRa than the second surface 232a, that is, at the position closer to the second cover portion 241.

The first step portion 231 is formed in an inner peripheral portion of the first cover portion 221, which includes the bell-mouth portion 221b. The first step portion 231 is opposed to the shroud-side inner peripheral end 541. The second step portion 232 is formed in the first cover portion 221 at a position, at which the second step portion 232 is opposed to the shroud-side outer peripheral end 542 in the fan axial direction DRa. The third step portion 233 is formed in the first cover portion 221 at a position, at which the first opening-forming surface 224 is formed.

As above, the first casing member 22 has the first step portion 231, the second step portion 232 and the third step portion 233. Therefore, it is possible to reduce a thickness of the casing 12 in the fan axial direction DRa in an outer area of the casing 12 in the fan radial direction DRr, when compared with a case in which the first casing member 22 has only two step portions.

As shown in FIG. 2, the third surface 233a has multiple recessed portions 233b. Each of the recessed portions 233b is arranged in the circumferential direction around the rotating shaft 14 at an interval. As a result, in the multiple recessed portions 233b, a boundary portion between neighboring recessed portions 233b is formed as a projected portion 233c. Each of the projected portions 233c straightly extends in the fan radial direction. A bottom surface of each recessed portion 233b is located at a position, which is closer to the other side of the fan axial direction DRa than any other portion of the third surface 233a except for the recessed portion 233b.

As above, the third surface 233a preferably has the multiple recessed portions 233b. According to such a structure, it is possible to make the first casing member 22 lighter in its weight than a case in which the third surface 233a does not have the recessed portions 233b.

As shown in FIG. 5, the second cover portion 241 of the second casing member 24 has a first step portion 251, a second step portion 252 and a third step portion 253. The first step portion 251, the second step portion 252 and the third step portion 253 are arranged in an order of the first step portion 251, the second step portion 252 and the third step portion 253 in the direction from the inside to the outside of the fan radial direction DRr.

The first step portion 251 has a first surface 251a. The second step portion 252 has a second surface 252a. The third step portion 253 has a third surface 253a. Each of the first surface 251a, the second surface 252a and the third surface 253a forms a part of an outer surface 241a of the second cover portion 241. The outer surface 241a of the second cover portion 241 is a surface of the second cover portion 241 on the other side of the fan axial direction DRa.

Each of the first surface 251a, the second surface 252a and the third surface 253a has a position different from one another in the fan axial direction DRa. More exactly, the second surface 252a is located at the position, which is closer to the one side of the fan axial direction DRa than the first surface 251a, that is, at the position closer to the first cover portion 221. The third surface 253a is located at the position, which is closer to the one side of the fan axial direction DRa than the second surface 252a, that is, at the position closer to the first cover portion 221.

The first step portion 251 is formed in the second cover portion 241 at a position, at which the electric motor 16 is supported. In other words, the first step portion 251 is formed at the position of the second cover portion 241, at which the second cover portion 241 is opposed to the electric motor 16 in the fan axial direction DRa. A portion for supporting the electric motor 16 is a portion, at which the bearing housing 29 is fixed.

The second step portion 252 is formed in the second cover portion 241 at a position, at which the second cover portion 241 is opposed to the plate-side outer peripheral end 602 in the fan axial direction DRa. The third step portion 253 is formed in the second cover portion 241 at a position, at which the second opening-forming surface 243 is formed.

As above, the second casing member 24 has the first step portion 251, the second step portion 252 and the third step portion 253. Therefore, it is possible to reduce the thickness of the casing 12 in the fan axial direction DRa in the outer area of the casing 12 in the fan radial direction DRr, when compared with a case in which the second casing member 24 has only two step portions.

The first step portion 251 has multiple convex portions 251b protruded to the one side of the fan axial direction DRa. Each of the convex portions 251b extends along a curved line. More exactly, each of the convex portions 251b extends in the circumferential direction around the rotating shaft 14.

According to the above structure, in which the multiple convex portions 251b of the curved line are formed in the first step portion 251 of the second cover portion 241, it is possible to increase strength of the first step portion 251. In addition, the thickness of the casing 12 can be made smaller, when compared with a case in which the first step portion 251 of the second cover portion 241 has convex portions protruded to the other side of the fan axial direction DRa.

Each of the convex portions 251b may extend in a radial fashion. The number of the convex portion 251b is not limited to the multiple number. One convex portion may be formed.

Next, detailed structures for a part of the first step portion 231 of the first cover portion 221 and a part of the shroud ring 54 will be explained.

Figure 6:
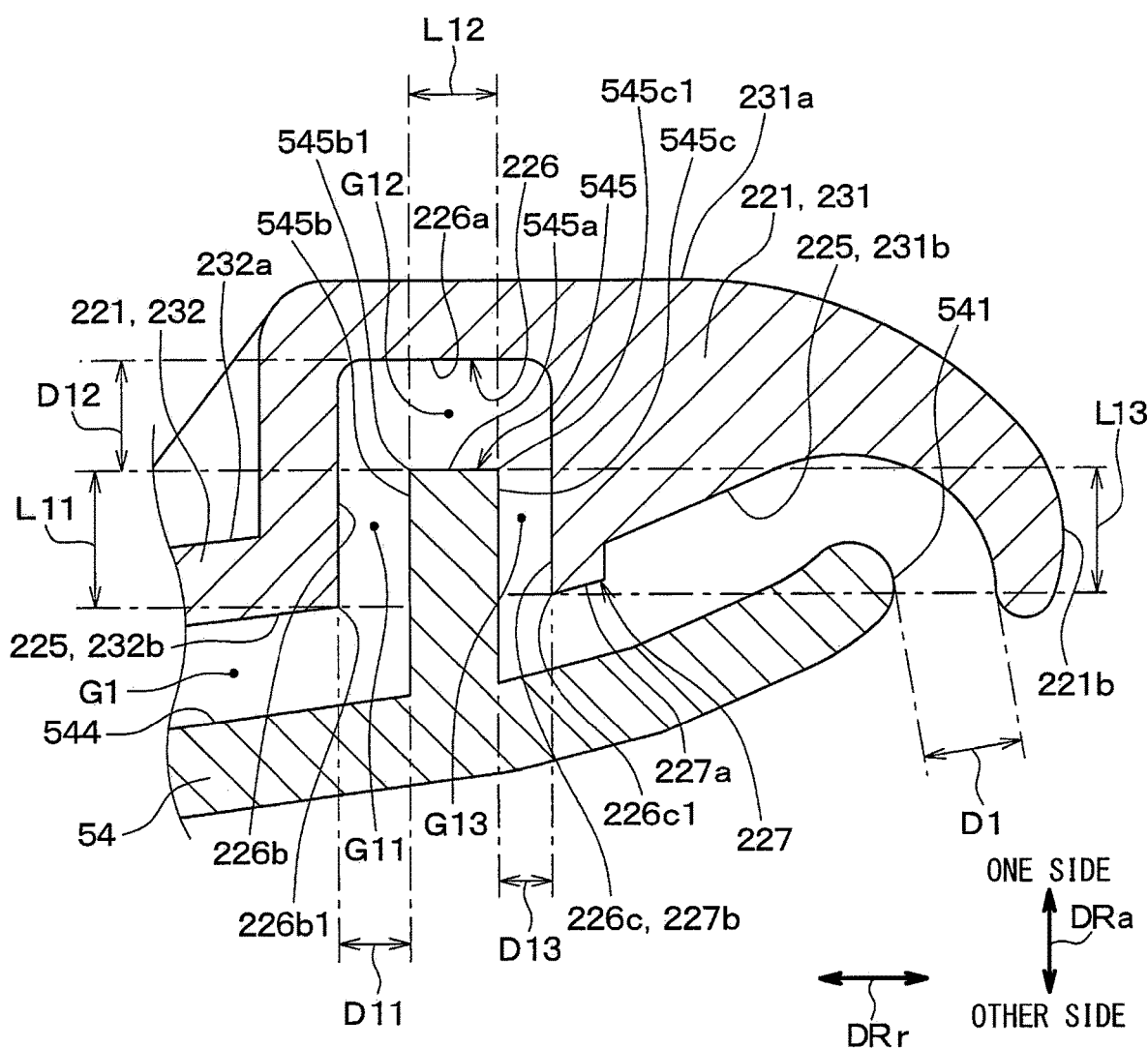
FIG. 6 is a schematically enlarged view showing a portion of FIG. 5 including a first step portion of a first cover portion and a part of a shroud ring.

As shown in FIG. 6, the first cover portion 221 has a cover-side opposing surface 225 opposing to the shroud ring 54. The shroud ring 54 has a shroud-side opposing surface 544 opposing to the first cover portion 221. The cover-side opposing surface 225 and the shroud-side opposing surface 544 form a gap G1 between them.

The cover-side opposing surface 225 includes a gap forming surface 231b of the first step portion 231 and a gap forming surface 232b of the second step portion 232. The gap forming surface 231b of the first step portion 231 is a surface of the first step portion 231, which forms the gap G1. The gap forming surface 231b of the first step portion 231 is the surface of the first step portion 231, which is located on the other side of the fan axial direction DRa. The gap forming surface 232b of the second step portion 232 is a surface of the second step portion 232, which forms the gap G1. The gap forming surface 232b of the second step portion 232 is the surface of the second step portion 232, which is located on the other side of the fan axial direction DRa.

The gap forming surface 231b of the first step portion 231 has a cover-side recessed portion 226. The cover-side recessed portion 226 is formed in an annular shape in the circumferential direction around a center position, which corresponds to the position of the fan center line CL. The cover-side recessed portion 226 has a bottom surface 226a, an outer peripheral side surface 226b and an inner peripheral side surface 226c. The bottom surface 226a is located at a position of the cover-side recessed portion 226 on the one side of the fan axial direction DRa. The outer peripheral side surface 226b is a side surface of the cover-side recessed portion 226, which is located at an outside of the cover-side recessed portion 226 in the fan radial direction DRr. The inner peripheral side surface 226c is a side surface of the cover-side recessed portion 226, which is located at an inside of the cover-side recessed portion 226 in the fan radial direction DRr.

The gap forming surface 231b of the first step portion 231 has a cover-side projecting portion 227. The cover-side projecting portion 227 is located at a position next to the cover-side recessed portion 226 and at an inside of the cover-side recessed portion 226 in the fan radial direction DRr. The cover-side projecting portion 227 has an other-side end surface 227a and an outer peripheral side surface 227b. The other-side end surface 227a is a flat end surface of the cover-side projecting portion 227 on the other side of the fan axial direction DRa. The outer peripheral side surface 227b is a side surface of the cover-side projecting portion 227 located at an outside thereof in the fan radial direction DRr. The outer peripheral side surface 227b of the cover-side projecting portion 227 also forms the inner peripheral side surface 226c of the cover-side recessed portion 226.

The shroud-side opposing surface 544 has a shroud-side projecting portion 545. The shroud-side projecting portion 545 is provided at the shroud-side opposing surface 544 in such an area, in which the shroud-side opposing surface 544 is opposed to the cover-side recessed portion 226 in the fan axial direction DRa. In the present embodiment, the shroud-side opposing surface 544 forms an other-side surface, which forms the gap between the first step portion of the first casing member and the shroud ring.

The shroud-side projecting portion 545 has a one-side end surface 545a, an outer peripheral side surface 545b and an inner peripheral side surface 545c. The one-side end surface 545a is a flat end surface, which is located on the one side of the shroud-side projecting portion 545 in the fan axial direction DRa. The outer peripheral side surface 545b is a side surface of the shroud-side projecting portion 545, which is located at an outside thereof in the fan radial direction DRr.

As shown in FIG. 4, the shroud-side projecting portion 545 is arranged in the circumferential direction around the fan center line CL. Therefore, the shroud-side projecting portion 545 is formed entirely in the circumferential direction of an area of the shroud-side opposing surface 544, which is opposing to the cover-side recessed portion 226.

As shown in FIG. 6, the shroud-side projecting portion 545 is arranged in an inside of the cover-side recessed portion 226. In this condition, the gap G1 is formed between the first cover portion 221 and the shroud ring 54. The gap G1 includes a first radial gap G11, an axial gap G12 and a second radial gap G13.

The first radial gap G11 is formed at an outside of the shroud-side projecting portion 545 in the fan radial direction DRr and between the shroud-side projecting portion 545 and the cover-side recessed portion 226 in the fan radial direction DRr. More exactly, the first radial gap G11 is formed between the outer peripheral side surface 545b of the shroud-side projecting portion 545 and the outer peripheral side surface 226b of the cover-side recessed portion 226. Therefore, the first radial gap G11 is a radial-direction gap formed between the first step portion 231 and the shroud ring 54 in the fan radial direction DRr.

The axial gap G12 is formed between the shroud-side projecting portion 545 and the cover-side recessed portion 226 in the fan axial direction DRa. More exactly, the axial gap G12 is formed between the one-side end surface 545a of the shroud-side projecting portion 545 and the bottom surface 226a of the cover-side recessed portion 226. Therefore, the axial gap G12 is formed between the first step portion 231 and the shroud ring 54 in the fan axial direction DRa. The axial gap G12 is located at an inside of the first radial gap G11 in the fan radial direction DRr.

The second radial gap G13 is formed at an inside of the shroud-side projecting portion 545 in the fan radial direction DRr and between the shroud-side projecting portion 545 and the cover-side recessed portion 226 in the fan radial direction DRr. More exactly, the second radial gap G13 is formed between the inner peripheral side surface 545c of the shroud-side projecting portion 545 and the inner peripheral side surface 226c of the cover-side recessed portion 226. Accordingly, the second radial gap G13 is formed between the first step portion 231 and the shroud ring 54 in the fan radial direction DRr.

The first radial gap G11, the axial gap G12 and the second radial gap G13 are connected to one another in an order of the first radial gap G11, the axial gap G12 and the second radial gap G13 in a direction from the outside to the inside of the fan radial direction DRr.

A minimum gap dimension D11 of the first radial gap G11 is smaller than a minimum gap dimension D12 of the axial gap G12. The minimum gap dimension D11 of the first radial gap G11 is a shortest distance in the first radial gap G11 between the shroud ring 54 and the first step portion 231. The minimum gap dimension D12 of the axial gap G12 is a shortest distance in the axial gap G12 between the shroud ring 54 and the first step portion 231.

In a similar manner, a minimum gap dimension D13 of the second radial gap G13 is smaller than the minimum gap dimension D12 of the axial gap G12. The minimum gap dimension D13 of the second radial gap G13 is a minimum distance in the second radial gap G13 between the shroud ring 54 and the first step portion 231. In addition, the minimum gap dimension D13 of the second radial gap G13 is smaller than the minimum gap dimension D11 of the first radial gap G11. Therefore, in the present embodiment, the respective gap dimensions D11, D12 and D13 satisfy the following relationship (1).

$$D12 > D11 > D13 \tag{1}$$

In addition, a minimum distance D1 between the shroud-side inner peripheral end 541 and the first cover portion 221 is larger than the minimum gap dimension D11 of the first radial gap G11. Therefore, in the present embodiment, the minimum distance D1 and the respective gap dimensions D11 and D13 satisfy the following relationship (2).

$$D1 > D11 > D13 \tag{2}$$

In addition, a length L11 of the first radial gap G11 in the fan axial direction DRa is larger than a length L12 of the axial gap G12 in the fan radial direction DRr. A length L13 of the second radial gap G13 in the fan axial direction DRa is larger than the length L12 of the axial gap G12 in the fan radial direction DRr. The length L11 of the first radial gap G11 in the fan axial direction DRa is larger than the length L13 of the second radial gap G13 in the fan axial direction DRa.

Accordingly, in the present embodiment, the respective lengths L11, L12 and L13 of the first radial gap G11, the axial gap G12 and the second radial gap G13 satisfy the following relationship (3).

$$L11 > L13 > L12 \tag{3}$$

Each of the lengths L11 and L13 of the first and the second radial gaps G11 and G13 is a length in the fan axial direction DRa in an area, in which the first cover portion 221 and the shroud ring 54 are opposed to each other in the fan radial direction DRr. More exactly, the length L11 of the first radial gap G11 is the length in the fan axial direction DRa between an other-side end 226b1 of the outer peripheral side surface 226b of the cover-side recessed portion 226 and a one-side end 545b1 of the outer peripheral side surface 545b of the shroud-side projecting portion 545. The other-side end 226b1 is an end of the outer peripheral side surface 226b of the cover-side recessed portion 226, which is located at a position on the other side of the fan axial direction DRa. The one-side end 545b1 is an end of the outer peripheral side surface 545b of the shroud-side projecting portion 545, which is located at a position on the one side of the fan axial direction DRa.

The length L13 of the second radial gap G13 is the length in the fan axial direction DRa between an other-side end 226c1 of the inner peripheral side surface 226c of the cover-side recessed portion 226 and a one-side end 545c1 of the inner peripheral side surface 545c of the shroud-side projecting portion 545. The other-side end 226c1 is an end of the inner peripheral side surface 226c of the cover-side recessed portion 226, which is located at a position on the other side of the fan axial direction DRa. The one-side end 545c1 is an end of the inner peripheral side surface 545c of the shroud-side projecting portion 545, which is located at a position on the one side of the fan axial direction DRa.

The length L12 of the axial gap G12 is a length of an area in the fan radial direction DRr, in which the first cover portion 221 and the shroud ring 54 are opposed to each in the fan axial direction DRa. In other words, the length L12 of the axial gap G12 is a width of the one-side end surface 545a of the shroud-side projecting portion 545 in the fan radial direction DRr. In the present embodiment, the width is a maximum width of a part of the shroud-side projecting portion 545 in the fan radial direction DRr, wherein the part of the shroud-side projecting portion 545 is located at a position inside of the cover-side recessed portion 226.

As explained above, in the present embodiment, the first radial gap G11, the axial gap G12 and the second radial gap G13 form the labyrinth sealing structure. According to this structure, it is possible to make the pressure loss larger, which is generated when the air flows through the gap G1. Therefore, it is possible to make smaller an amount of a reverse flow FL2 indicated in FIG. 5. The reverse flow FL2 is an air flow flowing in the gap G1 in a direction opposite to that of a main flow FL1 flowing through the blade passages 52a. The main flow FL1 is the air flow, which is generated by the turbo fan unit 18 and flows in the direction from the inside to the outside of the fan radial direction DRr.

In addition, each of the first radial gap G11 and the second radial gap G13 is formed at a position, which is outside of the shroud-side inner peripheral end 541 in the fan radial direction DRr. The minimum distance D1 between the shroud-side inner peripheral end 541 and the first cover portion 221 is larger than the minimum gap dimension D11 of the first radial gap G11 and the minimum gap dimension D13 of the second radial gap G13.

Now, such a comparison case which is different from the present embodiment is considered herein, according to which a radial gap having a gap dimension smaller than that of the axial gap G12 is formed at a position inside of the shroud-side inner peripheral end 541 in the fan radial direction DRr. In this comparison case, a gap dimension of an outlet portion, through which the reverse flow FL2 is discharged from the gap G1 to the blade passages 52a, becomes smaller. Therefore, flow speed of the reverse flow discharged from the gap G1 to the blade passages 52a is increased. As a result, the main flow flowing through the blade passages 52a is disturbed and noise is increased.

According to the present embodiment, however, it is possible to decrease the flow speed of the reverse flow FL2 discharged from the gap G1, when compared with the above comparison case in which the radial gap having the smaller gap dimension is formed at the position inside of the shroud-side inner peripheral end 541 in the fan radial direction DRr.

In addition, each of the length L11 of the first radial gap G11 and the length L13 of the second radial gap G13 is larger than the length L12 of the axial gap G12. Therefore, a sealing length of the labyrinth sealing structure can be made longer, when compared with a case in which each of the length L11 of the first radial gap G11 and the length L13 of the second radial gap G13 is smaller than the length L12 of the axial gap G12. According to this structure, it is possible to further decrease the amount of the reverse flow FL2.

According to the present embodiment, therefore, the disturbance of the main flow FL1 in the blade passages 52a can be suppressed, while the flow amount of the reverse flow FL2 can be suppressed. As a result, the noise, which may be generated when the main flow FL1 and the reverse flow FL2 join together, can be reduced.

Furthermore, according to the present embodiment, the first radial gap G11, the axial gap G12 and the second radial gap G13 form the labyrinth sealing structure. According to such a structure, the labyrinth sealing length can be made to be larger, when compared with a case in which the second radial gap G13 is not provided.

Furthermore, in the present embodiment, the minimum gap dimension D11 of the first radial gap G11 is larger than the minimum gap dimension D13 of the second radial gap G13.

In the present embodiment, when a deformation is generated in the turbo fan unit 18 by a centrifugal force, the shroud-side projecting portion 545 is moved in the direction to the outside of the fan radial direction DRr. Therefore, if the minimum gap dimension D11 of the first radial gap G11 was designed to be excessively smaller, the shroud ring 54 may be brought into contact with the first cover portion 221.

According to the present embodiment, however, it is possible to ensure a space for the first radial gap, even when the turbo fan unit 18 is deformed by the centrifugal force. In other words, it is possible to avoid a situation that the shroud ring 54 is brought into contact with the first cover portion 221, even when the minimum gap dimension D13 of the second radial gap G13 is made to be smaller in order to reduce the flow amount of the reverse flow.

In addition, according to the present embodiment, the first cover portion 221 has the first step portion 231, the second step portion 232 and the third step portion 233. The first step portion 231 forms the first radial gap G11, the axial gap G12 and the second radial gap G13. The second surface 232a of the second step portion 232 is located at the position, which is away from the first surface 231a of the first step portion 231 in the direction to the other side of the fan axial direction DRa.

The first cover portion 221 may have such a shape, which does not have the second step portion 232 and the third step portion 233. In other words, in an entire area of the first cover portion 221 from the inside to the outside of the fan radial direction DRr, the outer surface 221c of the first cover portion 221 is located at the position of the first surface 231a of the first step portion 231. However, in this case, the thickness of the casing 12 in the fan axial direction DRa is increased in the outer portion of the casing 12 in the fan radial direction DRr.

According to the present embodiment, however, it is possible to decrease the thickness of the casing 12 in the fan axial direction DRa in the outer portion of the casing 12 in the fan radial direction DRr, when compared with the case in which the first cover portion 221 does not have the second step portion 232 and the third step portion 233.

In addition, in the present embodiment, as shown in FIGS. 2 and 5, the first step portion 231 has a side surface 231c, which is located at an outside of the first step portion 231 in the fan radial direction DRr. Multiple projections 231d are provided in the side surface 231c. Each of the projections 231d extends from the one side to the other side of the side surface 231c in the fan axial direction DRa. More exactly, each of the projections 231d is formed in the side surface 231c to connect the first surface 231a to the second surface 232a. The multiple projections 231d are arranged at intervals in the circumferential direction around the rotating shaft 14. According to such a structure, strength of the first step portion 231 can be increased.

Second Embodiment

Figure 7:
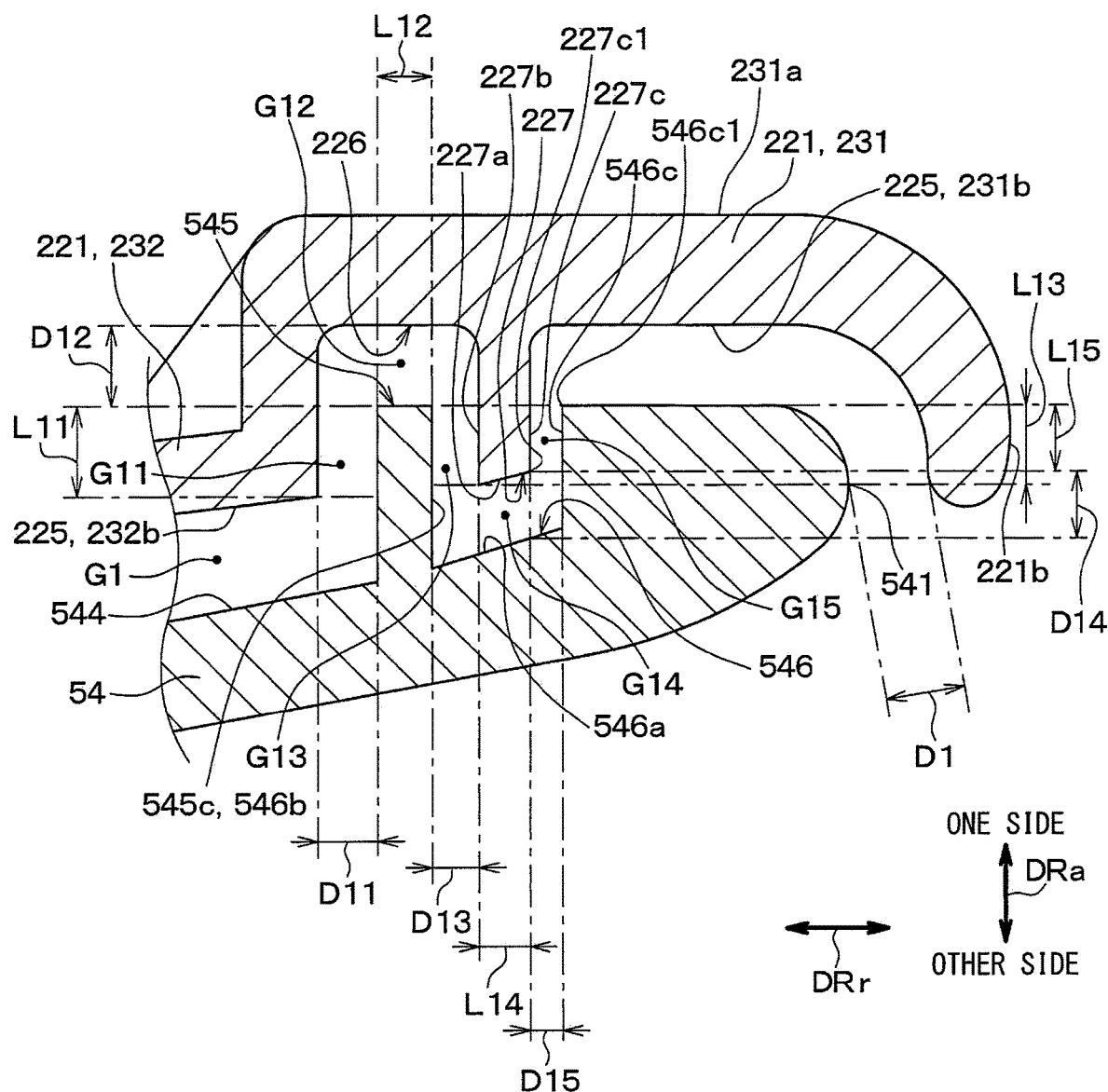
FIG. 7 is a schematically enlarged cross-sectional view showing a part of a centrifugal blower device of a second embodiment.

As shown in FIG. 7, the present embodiment differs from the first embodiment in that the gap G1 includes a second axial gap G14 and a third radial gap G15 in addition to the first radial gap G11, a first axial gap G12 and the second radial gap G13. The first axial gap G12 corresponds to the axial gap G12 of the first embodiment.

The shroud-side opposing surface 544 has a shroud-side recessed portion 546 at a position neighboring to the shroud-side projecting portion 545 and at a position inside of the shroud-side projecting portion 545 in the fan radial direction DRr. The shroud-side recessed portion 546 is formed in an annular shape in the circumferential direction around the rotating shaft 14. The shroud-side recessed portion 546 has a bottom surface 546a, an outer peripheral side surface 546b and an inner peripheral side surface 546c. The bottom surface 546a is located at a position on the other side of the shroud-side recessed portion 546 in the fan axial direction DRa. The outer peripheral side surface 546b is a side surface of the shroud-side recessed portion 546, which is located at an outside thereof in the fan radial direction DRr. The inner peripheral side surface 546c is a side surface of the shroud-side recessed portion 546, which is located at an inside thereof in the fan radial direction DRr. The outer peripheral side surface 546b of the shroud-side recessed portion 546 forms the inner peripheral side surface 545c of the shroud-side projecting portion 545. The cover-side projecting portion 227 is arranged in an inside of the shroud-side recessed portion 546.

The cover-side projecting portion 227 has an inner peripheral side surface 227c. The inner peripheral side surface 227c of the cover-side projecting portion 227 is a side surface, which is located at an inner side of the cover-side projecting portion 227 in the fan radial direction DRr.

The second axial gap G14 is formed between the cover-side projecting portion 227 and the shroud-side recessed portion 546 in the fan axial direction DRa. More exactly, the second axial gap G14 is formed between the other-side end surface 227a of the cover-side projecting portion 227 and the bottom surface 546a of the shroud-side recessed portion 546. The second axial gap G14 is located at a position inside of the second radial gap G13 in the fan radial direction DRr.

The third radial gap G15 is formed at a position inside of the cover-side projecting portion 227 in the fan radial direction DRr and between the cover-side projecting portion 227 and the shroud-side recessed portion 546 in the fan radial direction DRr. More exactly, the third radial gap G15 is formed between the inner peripheral side surface 227c of the cover-side projecting portion 227 and the inner peripheral side surface 546c of the shroud-side recessed portion 546. The third radial gap G15 is located at a position inside of the second axial gap G14 in the fan radial direction DRr.

A minimum gap dimension D15 of the third radial gap G15 is smaller than the minimum gap dimension D12 of the first axial gap G12 and a minimum gap dimension D14 of the second axial gap G14. In other words, the minimum gap dimension D15 satisfies the following relationship (4).

$$D12, D14 > D15 \quad (4)$$

The minimum gap dimension D15 of the third radial gap G15 is a shortest distance in the third radial gap G15 between the shroud ring 54 and the first step portion 231. The minimum gap dimension D14 of the second axial gap G14 is a shortest distance in the second axial gap G14 between the shroud ring 54 and the first step portion 231.

The minimum gap dimension D11 of the first radial gap G11 is smaller than the minimum gap dimension D14 of the second axial gap G14. In a similar manner, the minimum gap dimension D13 of the second radial gap G13 is smaller than the minimum gap dimension D14 of the second axial gap G14.

The minimum gap dimension D13 of the second radial gap G13 is larger than the minimum gap dimension D15 of the third radial gap G15. The minimum gap dimension D11 of the first radial gap G11 is larger than the minimum gap dimension D13 of the second radial gap G13. Accordingly, the respective gap dimensions D11, D13 and D15 satisfy the following relationship (5).

$$D11 > D13 > D15 \quad (5)$$

A length L15 of the third radial gap G15 in the fan axial direction DRa is larger than the length L12 of the first axial gap G12 in the fan radial direction DRr. The length L15 of the third radial gap G15 is larger than a length L14 of the second axial gap G14 in the fan radial direction DRr. The length L15 of the third radial gap G15 is smaller than the length L13 of the second radial gap G13 in the fan axial direction DRa. Therefore, the length L15 of the third radial gap G15 satisfies the following relationship (6).

$$L13 > L15 > L14, L12 \quad (6)$$

The length L15 of the third radial gap G15 is a length in the fan axial direction DRa of an area, in which the first cover portion 221 and the shroud ring 54 are opposed to each other in the fan radial direction DRr. More exactly, the length L15 of the third radial gap G15 is the length in the fan axial direction DRa between a one-side end 546c1 of the inner peripheral side surface 546c of the shroud-side recessed portion 546 and an other-side end 227c1 of the inner peripheral side surface 227c of the cover-side projecting portion 227. The one-side end 546c1 is an end of the inner peripheral side surface 546c of the shroud-side recessed portion 546, which is located at a position on the one side of the fan axial direction DRa. The other-side end 227c1 is an end of the inner peripheral side surface 227c of the cover-side projecting portion 227, which is located on the other side of the fan axial direction DRa.

The length L14 of the second axial gap G14 is a length in the fan radial direction DRr of an area, in which the first cover portion 221 and the shroud ring 54 are opposed to each other in the fan axial direction DRa. Namely, the length L14 of the second axial gap G14 is a width of the other-side end surface 227a of the cover-side projecting portion 227 in the fan radial direction DRr. In the present embodiment, the width is a maximum value in the fan radial direction DRr of a part of the cover-side projecting portion 227, which is arranged in the inside of the shroud-side recessed portion 546.

In the present embodiment, the first radial gap G11, the first axial gap G12, the second radial gap G13, the second axial gap G14 and the third radial gap G15 form the labyrinth sealing structure. According to this structure, it is possible to make the sealing length of the labyrinth sealing structure longer when compared with a case in which the second axial gap G14 and the third radial gap G15 are not provided. Therefore, it is possible to reduce the flow amount of the reverse flow FL2.

In the present embodiment, in the similar manner to the first embodiment, the first casing member 22 has the first step portion 231, the second step portion 232 and the third step portion 233. The first step portion 231 forms the labyrinth sealing structure. According to this structure, it is possible to make the thickness of the casing 12 in the fan axial direction DRa smaller at the outer portion of the casing 12 of the fan radial direction DRr, when compared with a case in which the second step portion 232 and the third step portion 233 are not provided in the first cover portion 221.

Third Embodiment

Figure 8:
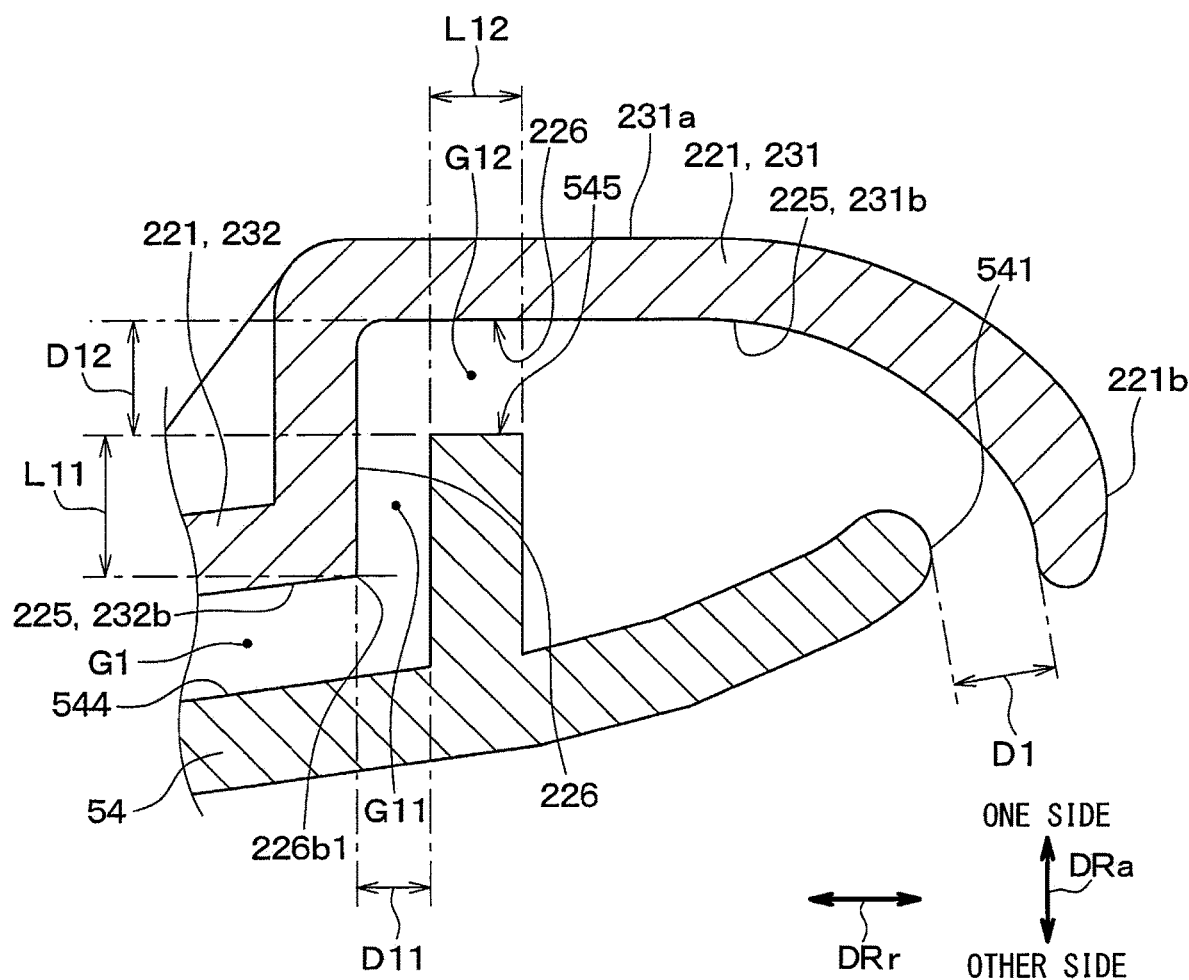
FIG. 8 is a schematically enlarged cross-sectional view showing a part of a centrifugal blower device of a third embodiment.

As shown in FIG. 8, the present embodiment differs from the first embodiment in that the gap G1 has only the first radial gap G11, among the first radial gap G11 and the second radial gap G13.

In the present embodiment, the gap forming surface 231b of the first step portion 231 does not have the cover-side projecting portion 227 of the first embodiment. Therefore, the width in the fan radial direction DRr of the cover-side recessed portion 226 of the present embodiment is larger than the width in the fan radial direction DRr of the cover-side recessed portion 226 of the first embodiment.

The radial gap G11 is formed at a position outside of the shroud-side projecting portion 545 in the fan radial direction DRr and between the shroud-side projecting portion 545 and the cover-side recessed portion 226 in the fan radial direction DRr. The radial gap G11 corresponds to the first radial gap G11 of the first embodiment.

As above, the radial gap G11 can be formed only at one side of the shroud-side projecting portion 545 in the fan radial direction. In the present embodiment, the same advantages to those of the first embodiment can be obtained.

Further Embodiments (1) In the first embodiment, the minimum gap dimension D13 of the second radial gap G13 is smaller than the minimum gap dimension D11 of the first radial gap G11. However, the minimum gap dimension D13 of the second radial gap G13 can be made to be equal to the minimum gap dimension D11 of the first radial gap G11. Furthermore, the minimum gap dimension D13 of the second radial gap G13 can be made larger than the minimum gap dimension D11 of the first radial gap G11, when the minimum gap dimension D13 of the second radial gap G13 is smaller than the minimum gap dimension D12 of the axial gap G12.

(2) In the first embodiment, the length L13 of the second radial gap G13 is smaller than the length L11 of the first radial gap G11. However, the length L13 of the second radial gap G13 can be made to be equal to the length L11 of the first radial gap G11. Furthermore, the length L13 of the second radial gap G13 can be made larger than the length L11 of the first radial gap G11, when the length L13 of the second radial gap G13 is smaller than the length L12 of the axial gap G12.

Figure 9:
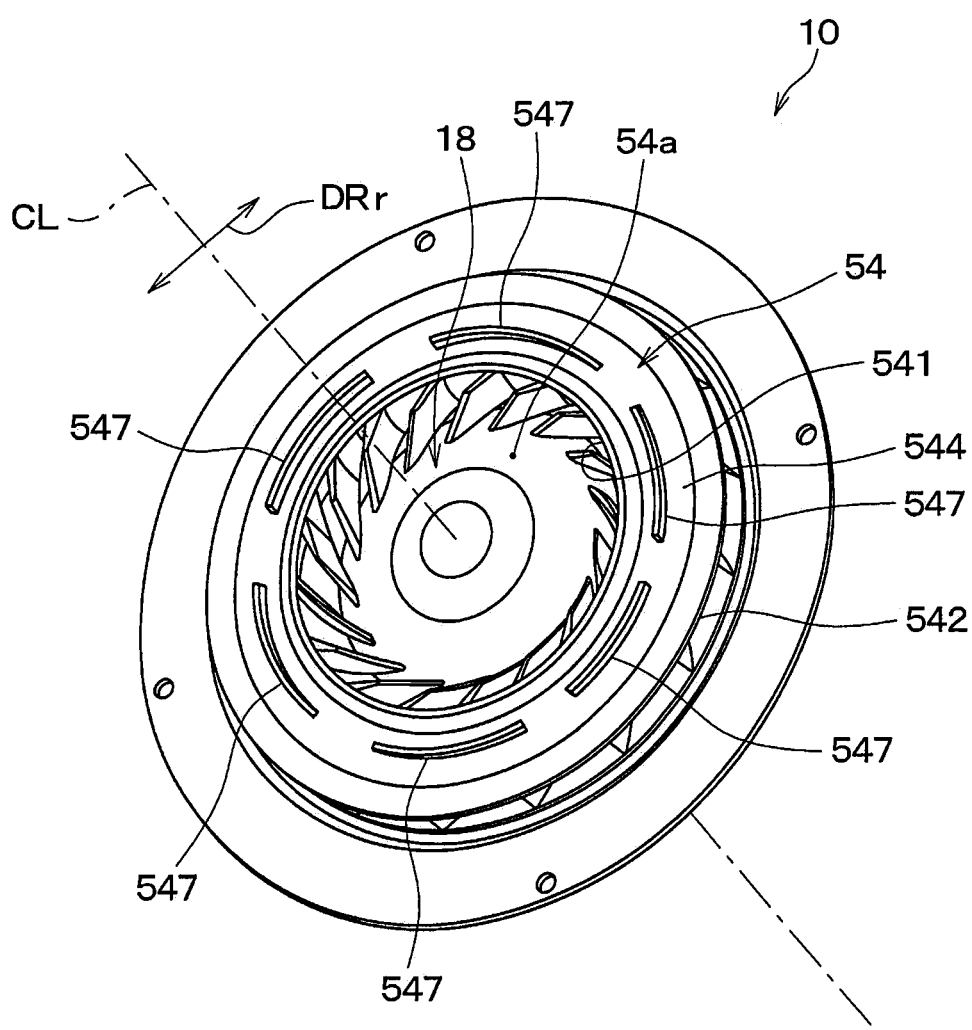
FIG. 9 is a schematic perspective view showing a centrifugal blower device of a further embodiment, wherein a first casing member is removed.

(3) In the above embodiments, the shroud-side projecting portion 545 is formed at the whole circumference of the annular area, at which the shroud-side opposing surface 544 is opposed to the cover-side recessed portion 266. However, as shown in FIG. 9, shroud-side projecting portions 547 may be formed at limited portions of the annular area, at which the shroud-side opposing surface 544 is opposed to the cover-side recessed portion 266. In other words, multiple shroud-side projecting portions 547 may be arranged in the circumferential direction at intervals.

The cover-side projecting portion 227 of the second embodiment may be modified in a similar manner. Namely, cover-side projecting portions may be formed at limited portions of the annular area, at which the cover-side opposing surface 225 is opposed to the shroud-side recessed portion 546.

(4) In the above embodiments, the boss-side guide portion 562 of the boss portion 56 forms the guide portion having the guide surface for guiding the air flow from the casing-side air suction port to the blade passages. A part or a member other than the boss portion 56 may be provided as a separate part or member for forming the guide portion.

(5) In the first embodiment, the one-side end surface 545a of the shroud-side projecting portion 545 is formed by the flat surface. However, it may be formed by a curved surface. In this case, a top portion of the one-side end surface 545a which is located at a position closest to the one side of the fan axial direction DRa is the one-side end 545b1 of the outer peripheral side surface 545b of the shroud-side projecting portion 545 or the one-side end 545c1 of the inner peripheral side surface 545c. In addition, in this case, the length L12 of the axial gap G12 is a maximum value in the fan radial direction DRr for a part of the shroud-side projecting portion 545, which is arranged in the inside of the cover-side recessed portion 226.

In a similar manner, in the second embodiment, the other-side end surface 227a of the cover-side projecting portion 227 is formed by the flat surface. However, it may be formed by a curved surface. In this case, a top portion of the other-side end surface 227a which is located at a position closest to the other side of the fan axial direction DRa is the other-side end 227c1 of the inner peripheral side surface 227c of the cover-side projecting portion 227. In addition, in this case, the length L14 of the second axial gap G14 is a maximum value in the fan radial direction DRr for a part of the cover-side projecting portion 227, which is arranged in the inside of the shroud-side recessed portion 546.

Figure 10:
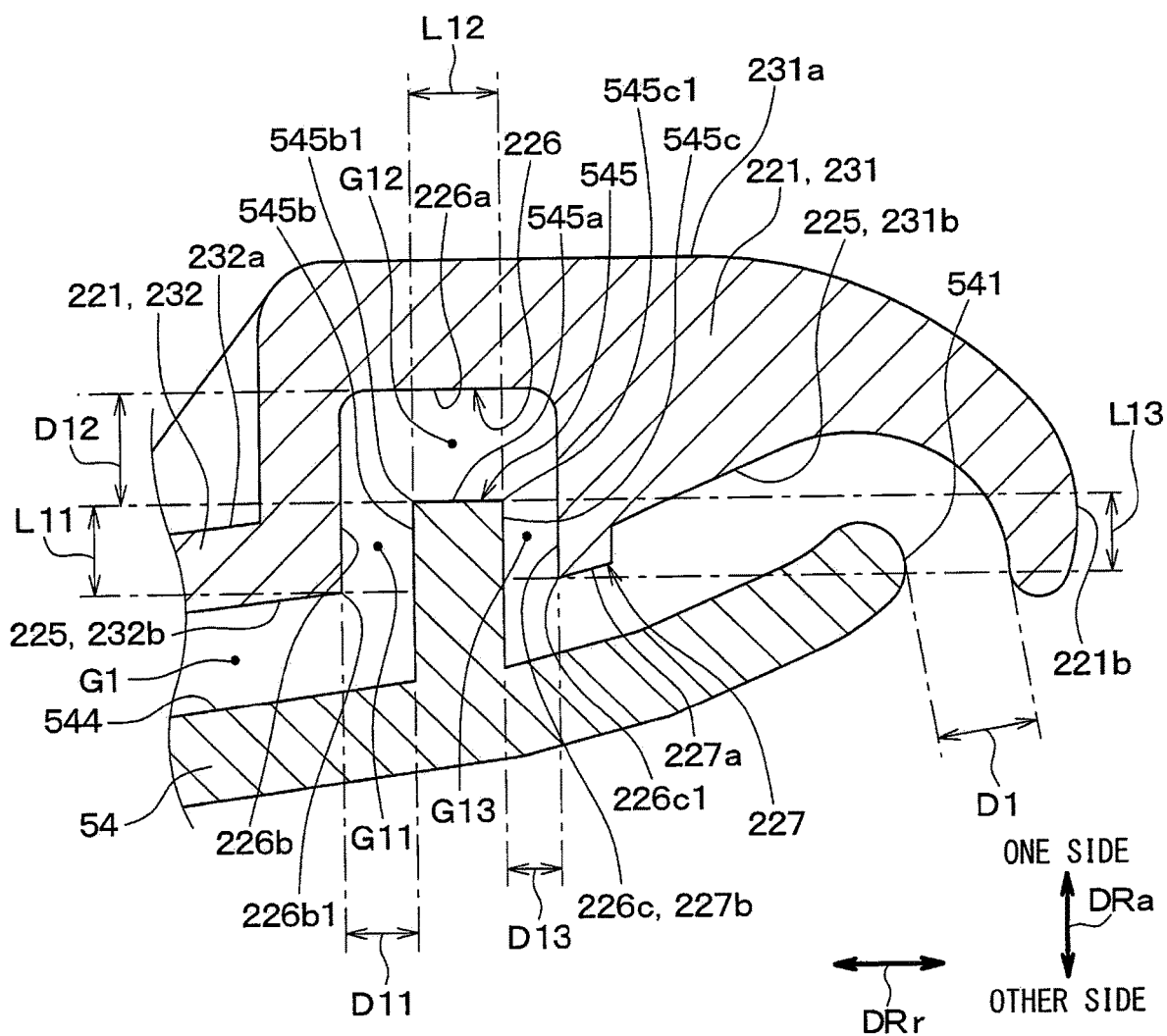
FIG. 10 is a schematically enlarged cross-sectional view showing a part of a centrifugal blower device of a further embodiment.
Figure 11:
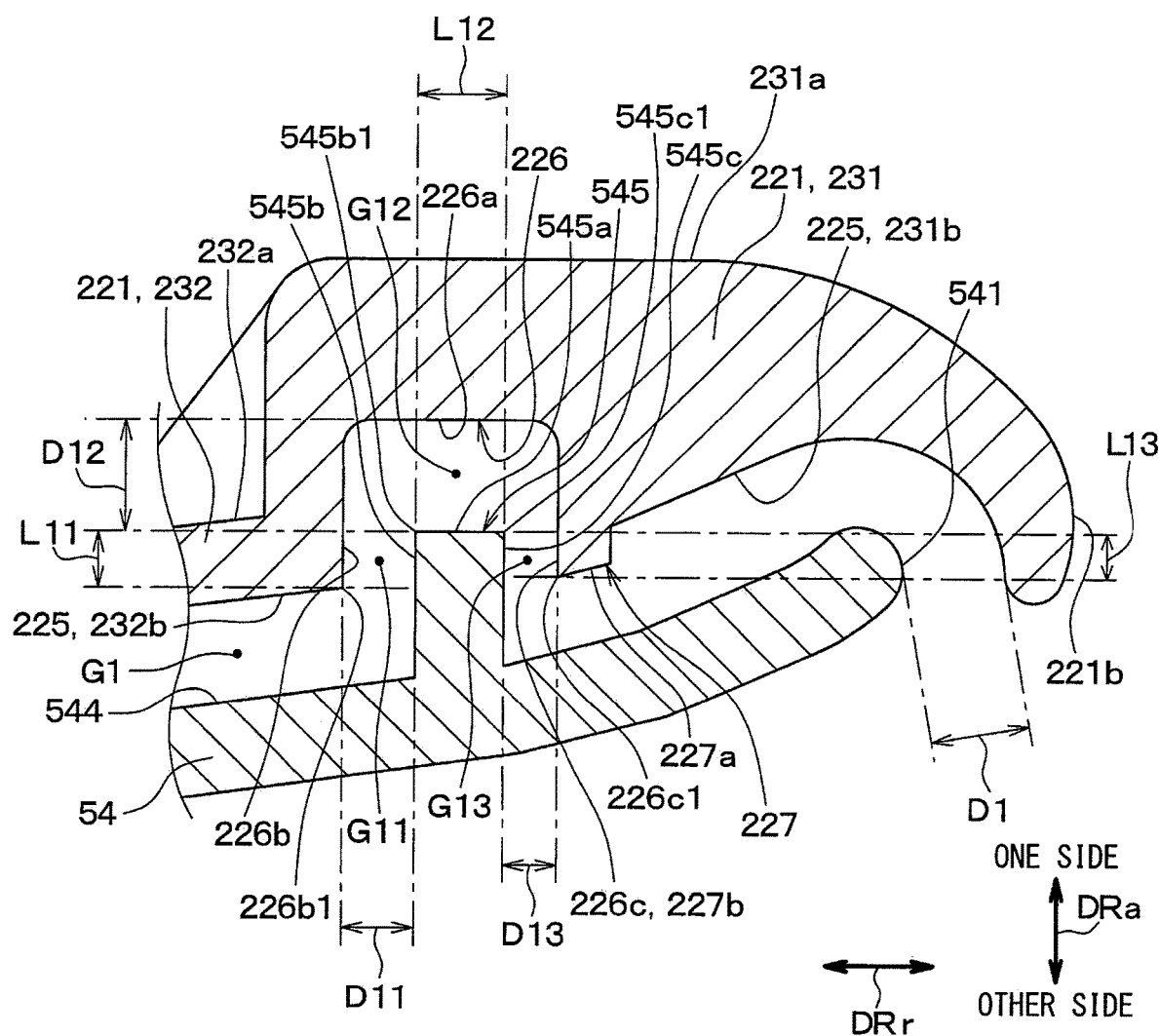
FIG. 11 is a schematically enlarged cross-sectional view showing a part of a centrifugal blower device of a further embodiment.

(6) In the above embodiments, the length L11 of the first radial gap G11 is larger than the length L12 of the axial gap G12. However, as shown in FIG. 10, the length L11 of the first radial gap G11 may be made to be equal to the length L12 of the axial gap G12. Alternatively, as shown in FIG. 11, the length L11 of the first radial gap G11 may be made to be smaller than the length L12 of the axial gap G12. The length L11 of the first radial gap G11 can be made to be one of them. According to this structure, the same advantages to those of the above embodiments can be obtained, except for the advantage which is obtained by making the length L11 of the first radial gap G11 larger than the length L12 of the axial gap G12.

(7) The present disclosure is not limited to the above embodiments but can be modified in various manners within a scope defined in the claims. The present disclosure includes various kinds of modified embodiments and such modifications included in equivalent areas. In addition, the above embodiments are not unrelated to one another and can be appropriately combined to one another except for such a case in which the combination is impossible in an obvious fashion. In addition, it is needless to say that the elements for forming the embodiments are not always necessary, unless the elements are explicitly disclosed as the necessary elements or it is considered that the elements are necessary in principle. In addition, in the above embodiments, when the values for the number, the numerical values, the quantity, the ranges or the like are referred to for the elements of the embodiments, the present disclosure is not limited to those specified values, except for a case in which those values are explicitly disclosed as necessary or the present disclosure should be limited to those specified values in principle. In addition, when the above embodiments refer to the material, the shape, the positional relationships and so on for the respective elements, the present disclosure is not limited to those material, the shapes, the positional relationships and so on, unless the present disclosure explicitly discloses or the present disclosure is limited in principle to those of the specified material, the shapes, the positional relationships and so on.

SUMMARY

According to a first point disclosed in a part or in an entire portion of each of the above embodiments, the centrifugal blower device includes the rotating shaft, the turbo fan unit and the casing. The turbo fan unit includes the multiple fan blades, the shroud ring and the other-side side plate. The shroud ring includes the shroud-side inner peripheral end. The casing includes the cover portion. The shroud ring and the cover portion form the gap between them. The gap includes the radial gap and the axial gap. The radial gap is located at the outside of the shroud-side inner peripheral end in the radial direction. The axial gap is located at the inside of the radial gap in the radial direction. The minimum gap dimension of the radial gap is smaller than the minimum gap dimension of the axial gap. The shortest distance between the shroud-side inner peripheral end and the cover portion is larger than the minimum gap dimension of the radial gap.

In addition, according to a second point, the length of the radial gap in the axial direction is larger than the length of the axial gap in the radial direction.

According to a third point, the cover portion has the cover-side opposing surface. The cover-side opposing surface has the cover-side recessed portion. The shroud ring has the shroud-side opposing surface. The shroud-side opposing surface has the shroud-side projecting portion. The shroud-side projecting portion is arranged in the inside of the cover-side recessed portion. The radial gap is defined as the first radial gap. The first radial gap is formed at the outside of the shroud-side projecting portion in the radial direction and between the shroud-side projecting portion and the cover-side recessed portion in the radial direction. The axial gap is formed between the shroud-side projecting portion and the cover-side recessed portion in the axial direction. The gap includes the second radial gap. The second radial gap is formed at the inside of the shroud-side projecting portion in the radial direction and between the shroud-side projecting portion and the cover-side recessed portion in the radial direction. The minimum gap dimension of the second radial gap is smaller than the minimum gap dimension of the axial gap. The length of the second radial gap in the axial direction is larger than the length of the axial gap in the radial direction.

As above, it is possible to form the first radial gap, the axial gap and the second radial gap. According to such a structure, the sealing length of the labyrinth sealing structure can be made larger, when compared with the case in which the second radial gap is not formed.

In addition, according to a fourth point, the cover-side recessed portion has the outer peripheral side surface and the inner peripheral side surface. The shroud-side projecting portion has the outer peripheral side surface and the inner peripheral side surface. The length of the first radial gap is the distance in the axial direction between the end of the outer peripheral side surface of the cover-side recessed portion, which is located on the other side of the axial direction, and the end of the outer peripheral side surface of the shroud-side projecting portion, which is located on the one side of the axial direction. The length of the second radial gap is the distance in the axial direction between the end of the inner peripheral side surface of the cover-side recessed portion, which is located on the other side of the axial direction, and the end of the inner peripheral side surface of the shroud-side projecting portion, which is located on the one side of the axial direction. The length of the axial gap is the maximum width of the part of the shroud-side projecting portion in the radial direction, wherein the part of the shroud-side projecting portion is arranged in the inside of the cover-side recessed portion.

The length of each gap can be concretely defined as above.

In addition, according to a fifth point, the minimum gap dimension of the first radial gap is larger than the minimum gap dimension of the second radial gap. According to the structure, it is possible to ensure the space for the first radial gap, even when the turbo fan unit is deformed by the centrifugal force.

In addition, according to a sixth point, the axial gap is defined as the first axial gap. The shroud-side opposing surface has the shroud-side recessed portion. The cover-side opposing surface has the cover-side projecting portion. The cover-side projecting portion is arranged in the inside of the shroud-side recessed portion. The second axial gap is formed between the cover-side projecting portion and the shroud-side recessed portion in the axial direction. The third radial gap is formed at the inside of the cover-side projecting portion in the radial direction and between the cover-side projecting portion and the shroud-side recessed portion in the radial direction. The minimum gap dimension of the third radial gap is smaller than the minimum gap dimension of the first radial gap and the minimum gap dimension of the second radial gap. The length of the third radial gap in the axial direction is larger than the length of the second radial gap in the radial direction.

As above, it is possible to further provide the second axial gap and the third radial gap. According to the structure, the sealing length can be made larger, when compared with the case in which the second axial gap and the third radial gap are not provided.

In addition, according to a seventh point, the shroud-side recessed portion has inner peripheral side surface. The cover-side projecting portion has the inner peripheral side surface. The length of the third radial gap is the distance in the axial direction between the end of the inner peripheral side surface of the shroud-side recessed portion, which is located on the one side of the axial direction, and the end of the inner peripheral side surface of the cover-side projecting portion, which is located on the other side of the axial direction. The length of the second axial gap is the maximum width in the radial direction of the part of the cover-side projecting portion, wherein the part of the cover-side projecting portion is arranged in the inside of the shroud-side recessed portion.

The length of each gap can be concretely defined as above.

In addition, according to an eighth point, the minimum gap dimension of the second radial gap is larger than the minimum gap dimension of the third radial gap. The minimum gap dimension of the first radial gap is larger than the minimum gap dimension of the second radial gap.

According to the above structure, it is possible to ensure the space for the first radial gap and the second radial gap, even when the turbo fan unit is deformed by the centrifugal force.

In addition, according to a ninth point, the cover portion has the first step portion for forming the axial gap and the radial gap, and the second step portion located at the position outside of the first step portion in the radial direction. The surface on the one side of the second step portion in the axial direction is located at the position closer to the other side of the axial direction than the surface on the one side of the first step portion in the axial direction.

According to the above structure, it is possible to reduce the thickness of the casing in the axil direction, when compared with the case in which the second step portion is not provided in the cover portion.

In addition, according to a tenth point, the first step portion has the side surface located at the outside of the first step portion in the radial direction. The multiple projections are formed in the side surface. Each of the projections extends in the side surface from the one side to the other side of the axial direction.

According to the above structure, it is possible to increase the strength of the first step portion.

In addition, according to an eleventh point, the cover portion has the cover-side inner peripheral end at its inner side for forming the casing-side air suction port, through which the air is sucked. The neighboring fan blades respectively form the blade passage, through which the air flows. The centrifugal blower device has the guide portion having the guide surface for guiding the air from the casing-side air suction port to the respective blade passages.

The axial end of the guide surface located on the one side of the axial direction is located at the position closer to the one side of the axial direction than the axial end of the shroud-side inner peripheral end located on the one side of the axial direction. The axial end of the guide surface, which is located on the one side of the axial direction, is located at the position more away to the other side from the axial end of the cover-side inner peripheral end, which is located on the one side of the axial direction.

According to the above structure, it is possible to change the direction of the air flow from the axial direction to the radial direction at the more upstream side.

In addition, according to a twelfth point, the length of the radial gap in the axial direction is equal to the length of the axial gap in the radial direction. It is possible to make the length of the radial gap in the axial direction in the above manner.

In addition, according to a thirteenth point, the length of the radial direction in the axial direction is smaller than the length of the axial gap in the radial direction. It is possible to make the length of the radial gap in the axial direction in the above manner.

What is claimed is:

1. A centrifugal blower device comprising:
a rotating shaft;
a turbo fan unit fixed to the rotating shaft and rotated together with the rotating shaft; and
a casing for accommodating therein the turbo fan unit,
wherein the turbo fan unit includes;
multiple fan blades arranged around the rotating shaft;
a shroud ring of an annular shape connected to a one-side blade end of each of the multiple fan blades, each of which is located on a one side of an axial direction of the rotating shaft; and
an other-side plate connected to each of other-side blade ends, each of which is located on an other side of the axial direction of the rotating shaft,
wherein
the shroud ring has a shroud-side inner peripheral end for forming a fan-side air suction port at an inside of the turbo fan unit in a radial direction, so that air is sucked through the fan-side air suction port,
the casing has a cover portion arranged at a position of the one side of the axial direction with respect to the shroud ring,
the shroud ring and the cover portion forms a gap between them,
the gap includes a radial gap formed between the cover portion and the shroud ring in the radial direction, and an axial gap formed between the cover portion and the shroud ring in the axial direction,
the radial gap is located at a position outside of the shroud-side inner peripheral end in the radial direction,
the axial gap is located at a position inside of the radial gap in the radial direction,
a minimum value for a gap dimension of the radial gap, which corresponds to a shortest distance between the shroud ring and the cover portion in the radial direction, is smaller than a minimum value for a gap dimension of the axial gap, which corresponds to a shortest distance between the shroud ring and the cover portion in the axial direction,
a shortest distance between the shroud-side inner peripheral end and the cover portion is larger than the minimum value for the gap dimension of the radial gap,
a length of the radial gap in the axial direction is larger than a length of the axial gap in the radial direction,
the cover portion has a cover-side opposing surface opposed to the shroud ring,
the cover-side opposing surface has a cover-side recessed portion at an outside of the shroud-side inner peripheral end in the radial direction, wherein the cover-side recessed portion is formed in an annular shape around a center position of the rotating shaft,
the shroud ring has a shroud-side opposing surface opposed to the cover portion,
the shroud-side opposing surface has a shroud-side projecting portion formed at least in a part of an area, at which the shroud-side opposing surface is opposed to the cover-side recessed portion,
a part of the shroud-side projecting portion is arranged in an inside of the cover-side recessed portion,
the radial gap is defined as a first radial gap,
the first radial gap is formed at a position outside of the shroud-side projecting portion in the radial direction and between the shroud-side projecting portion and the cover portion in the radial direction,
the axial gap is formed between the shroud-side projecting portion and the cover-side recessed portion in the axial direction,
the gap further includes a second radial gap,
the second radial gap is formed at a position inside of the shroud-side projecting portion in the radial direction and between the shroud-side projecting portion and the cover-side recessed portion in the radial direction,
a minimum value for a gap dimension of the second radial gap, which corresponds to a shortest distance in the second radial gap between the shroud ring and the cover portion in the radial direction, is smaller than the minimum value for the gap dimension of the axial gap,
a length of the second radial gap in the axial direction is larger than the length of the axial gap in the radial direction;
the axial gap is defined as a first axial gap,
the shroud-side opposing surface has a shroud-side recessed portion at a position inside of the shroud-side projecting portion and neighboring to the shroud-side projecting portion, wherein the shroud-side recessed portion is formed in an annular shape around the center position of the rotating shaft,
the cover-side opposing surface has a cover-side projecting portion formed at least in a part of an area, at which the cover-side opposing surface is opposed to the shroud-side recessed portion,
a part of the cover-side projecting portion is arranged in an inside of the shroud-side recessed portion,
a second axial gap is formed between the cover-side projecting portion and the shroud-side recessed portion in the axial direction, a third radial gap is formed at a position inside of the cover-side projecting portion in the radial direction and between the cover-side projecting portion and the shroud-side recessed portion in the radial direction, a minimum value for a gap dimension of the third radial gap, which corresponds to a shortest distance in the third radial gap between the shroud ring and the cover portion in the radial direction, is smaller than not only the minimum value for the gap dimension of the first axial gap but also a minimum value for a gap dimension of the second axial gap, which corresponds to a shortest distance in the second axial gap between the shroud ring and the cover portion in the axial direction, and a length of the third radial gap in the axial direction is larger than a length of the second axial gap in the radial direction.

2. The centrifugal blower device according to claim 1, wherein the cover-side recessed portion has an outer peripheral side surface, which is located at a position outside of the cover-side recessed portion in the radial direction, and an inner peripheral side surface, which is located at a position inside of the cover-side recessed portion in the radial direction, the shroud-side projecting portion has an outer peripheral side surface, which is located at a position outside of the shroud-side projecting portion in the radial direction, and an inner peripheral side surface, which is located at a position inside of the shroud-side projecting portion in the radial direction, a length of the first radial gap corresponds to a distance in the axial direction between an other-side end, which is an end of the outer peripheral side surface of the cover-side recessed portion and which is located on the other side of the axial direction, and a one-side end, which is an end of the outer peripheral side surface of the shroud-side projecting portion and which is located on the one side of the axial direction, the length of the second radial gap corresponds to a distance in the axial direction between an other-side end, which is an end of the inner peripheral side surface of the cover-side recessed portion and which is located on the other side of the axial direction, and a one-side end, which is an end of the inner peripheral side surface of the shroud-side projecting portion and which is located on the one side of the axial direction, and the length of the axial gap corresponds to a maximum value for a width of a part of the shroud-side projecting portion in the radial direction, which is arranged in an inside of the cover-side recessed portion.

3. The centrifugal blower device according to claim 1, wherein the minimum value for the gap dimension of the first radial gap is larger than the minimum value for the gap dimension of the second radial gap.

4. The centrifugal blower device according to claim 1, wherein the shroud-side recessed portion has an inner peripheral side surface, which is located at a position inside of the shroud-side recessed portion in the radial direction, the cover-side projecting portion has an inner peripheral side surface, which is located at a position inside of the cover-side projecting portion in the radial direction, the length of the third radial gap corresponds to a distance in the axial direction between an other-side end, which is an end of the inner peripheral side surface of the cover-side projecting portion and which is located on the other side of the axial direction, and a one-side end, which is an end of the inner peripheral side surface of the shroud-side recessed portion and which is located on the one side of the axial direction, and the length of the second axial gap corresponds to a maximum value for a width of a part of the cover-side projecting portion in the radial direction, which is arranged in an inside of the shroud-side recessed portion.

5. The centrifugal blower device according to claim 1, wherein the minimum value for the gap dimension of the second radial gap is larger than the minimum value for the gap dimension of the third radial gap, and the minimum value for the gap dimension of the first radial gap is larger than the minimum value for the gap dimension of the second radial gap.

6. The centrifugal blower device according to claim 1, wherein the cover portion has a first step portion for forming the radial gap and the axial gap, and a second step portion located at a position outside of the first step portion in the radial direction, a second surface of the second step portion, which is formed on the one side of the axial direction, is located at a position closer to the other side of the axial direction than a first surface of the first step portion, which is formed on the one side of the axial direction.

7. The centrifugal blower device according to claim 6, wherein the first step portion has a side surface formed at a position outside thereof in the radial direction, multiple projections are formed in the side surface, and each of the multiple projections extends from the one side to the other side of the axial direction.

8. The centrifugal blower device according to claim 1, wherein the cover portion has a casing-side inner peripheral portion at a position inside thereof in the radial direction, wherein the casing-side inner peripheral portion forms a casing-side air suction port through which the air is sucked, respective neighboring fan blades of the multiple fan blades form blade passages, through which the air flows, the centrifugal blower device includes a guide portion having a guide surface for guiding the air flowing from the casing-side air suction port to the blade passages, a one-side axial end of the guide surface, which is located at a position on the one side of the axial direction, is located at a position closer to the one side of the axial direction than a one-side axial end of the shroud-side inner peripheral end, which is located at a position on the one side of the axial direction, and the one-side axial end of the guide surface is located at a position closer to the other side of the axial direction than an axial end, which is a part of the casing-side inner peripheral portion of the cover portion and which is located on the one side of the axial direction.

* * * * *